Feb. 17, 1953    R. M. GOODWIN    2,628,511
DYNAMO BRUSH MACHINE
Filed Sept. 30, 1948    21 Sheets-Sheet 1

Inventor
Richard M. Goodwin
by Spencer Hardman & Feher
his attorneys

Feb. 17, 1953     R. M. GOODWIN     2,628,511
DYNAMO BRUSH MACHINE
Filed Sept. 30, 1948     21 Sheets-Sheet 4

INVENTOR.
Richard M. Goodwin
BY Spencer Hardman & Fisher
his attorneys

Feb. 17, 1953 R. M. GOODWIN 2,628,511
DYNAMO BRUSH MACHINE
Filed Sept. 30, 1948 21 Sheets-Sheet 5

Inventor
Richard M. Goodwin
by Spencer Hardman & Fehr
his attorneys

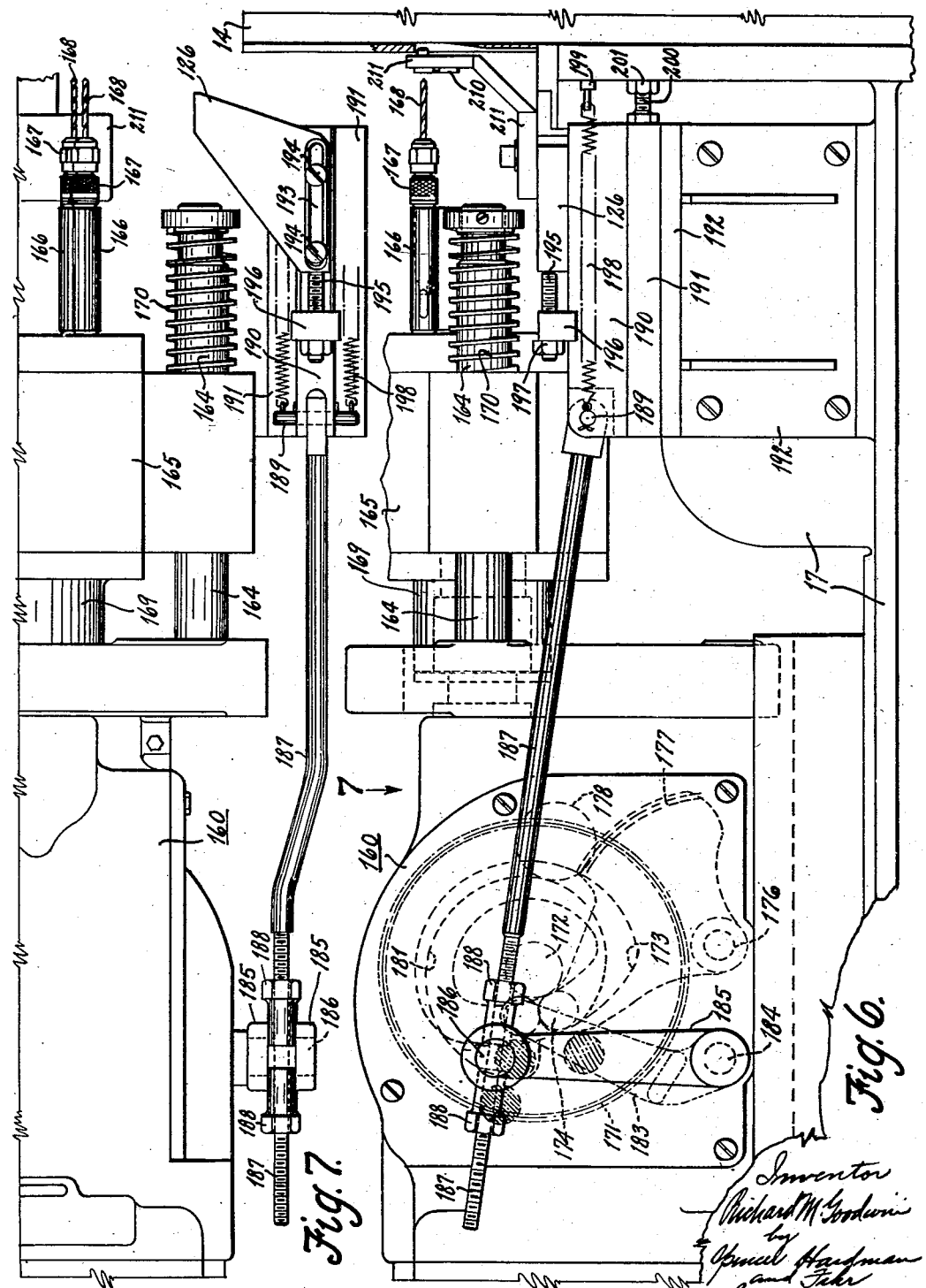

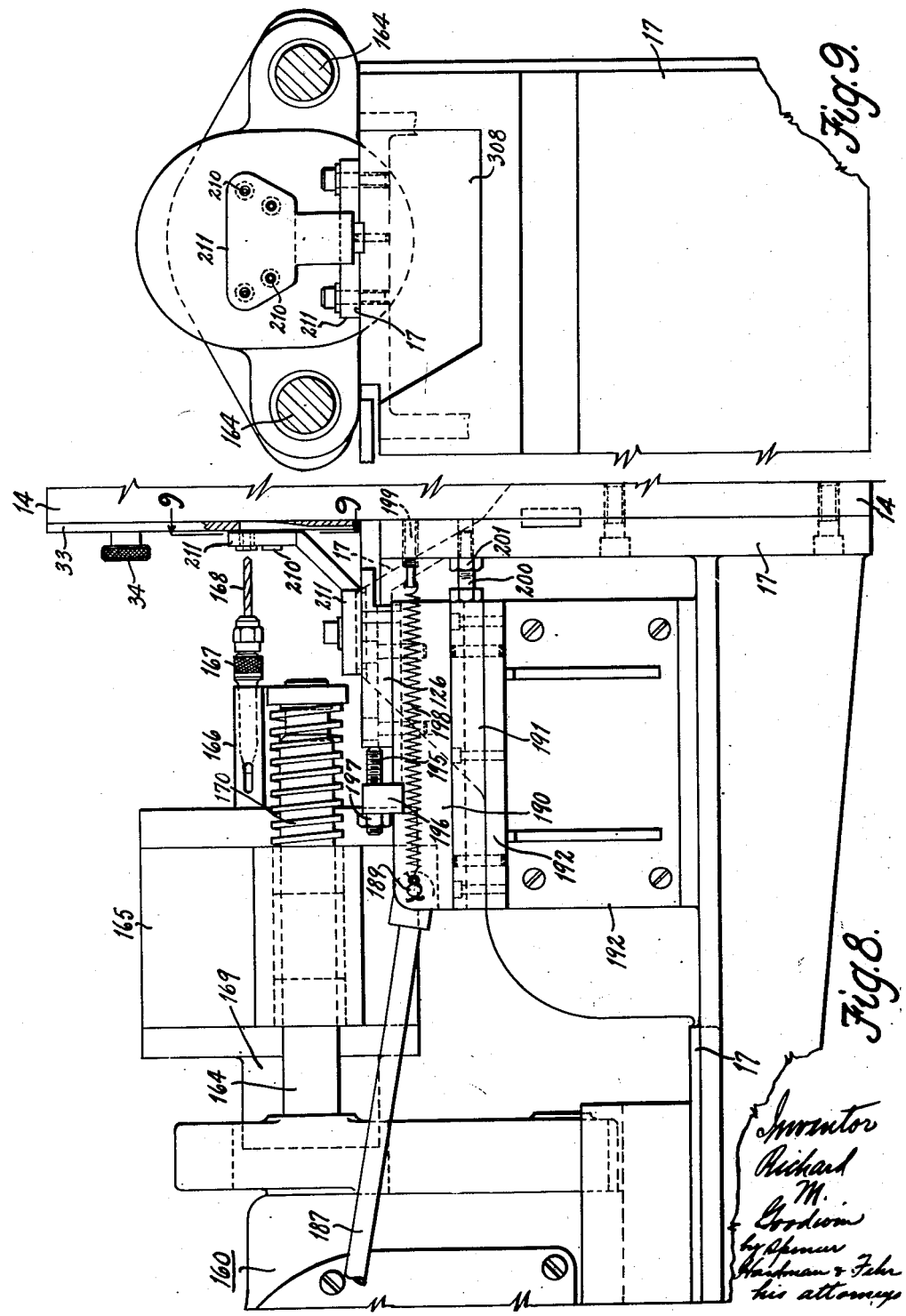

Feb. 17, 1953      R. M. GOODWIN      2,628,511
DYNAMO BRUSH MACHINE
Filed Sept. 30, 1948      21 Sheets-Sheet 8

INVENTOR.
Richard M. Goodwin
BY
Spencer Hardman & Fehr
his attorneys

Feb. 17, 1953  R. M. GOODWIN  2,628,511
DYNAMO BRUSH MACHINE
Filed Sept. 30, 1948  21 Sheets-Sheet 9
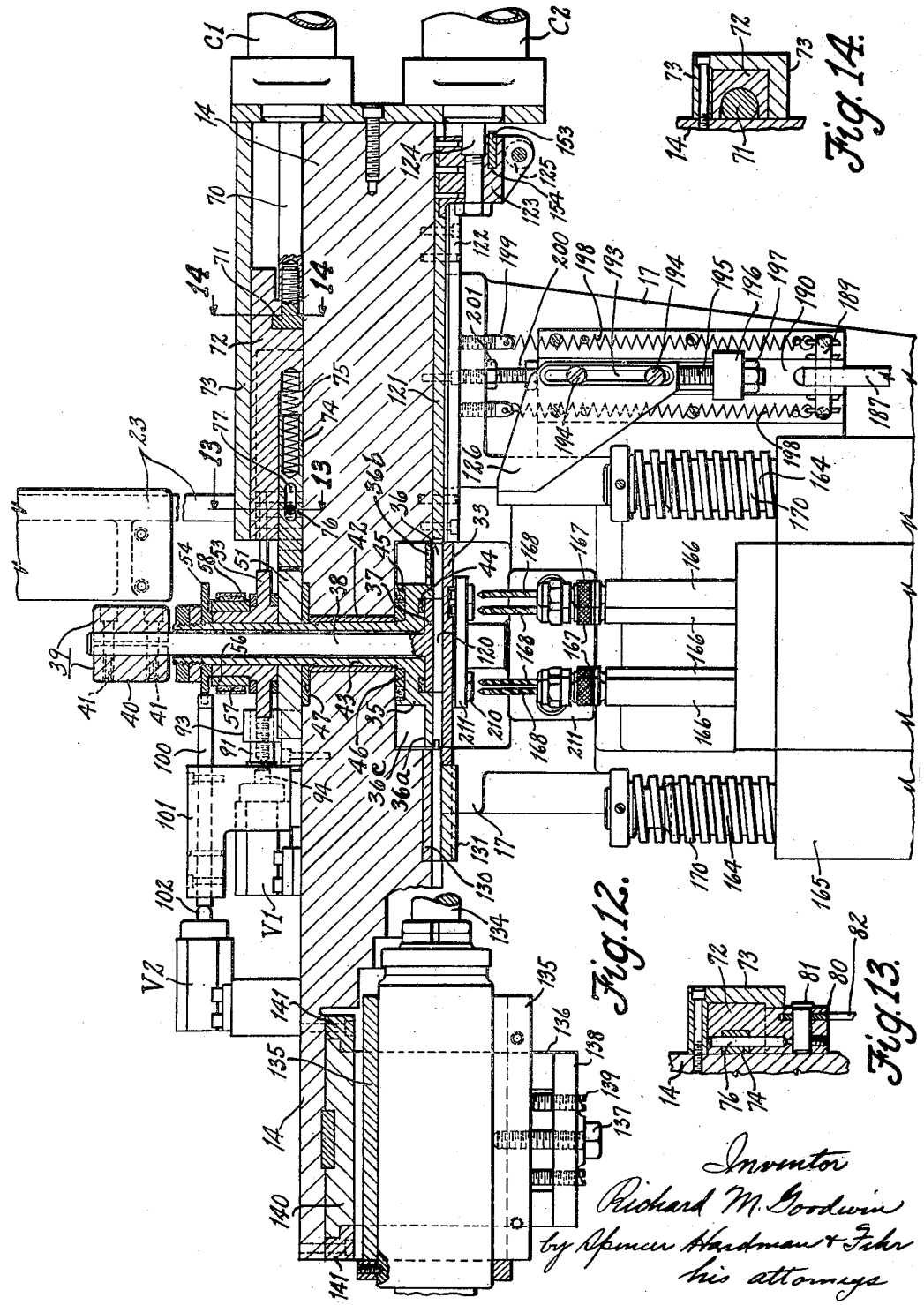
Inventor
Richard M. Goodwin
by Spencer Hardman & Fehr
his attorneys

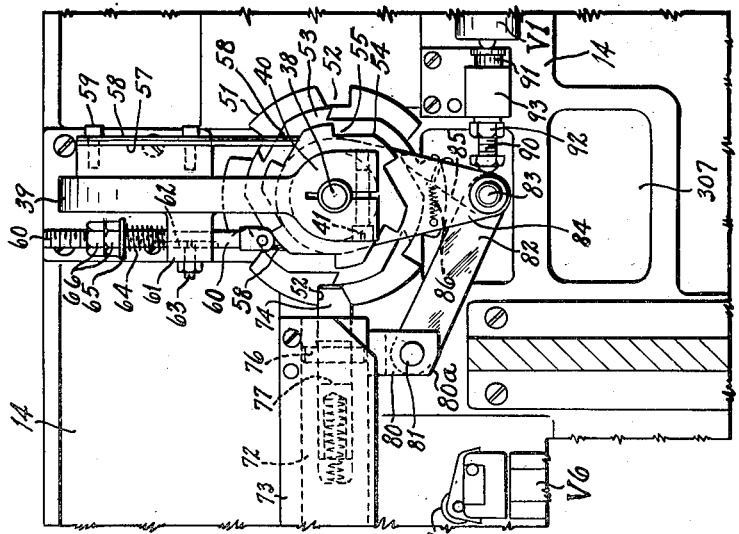
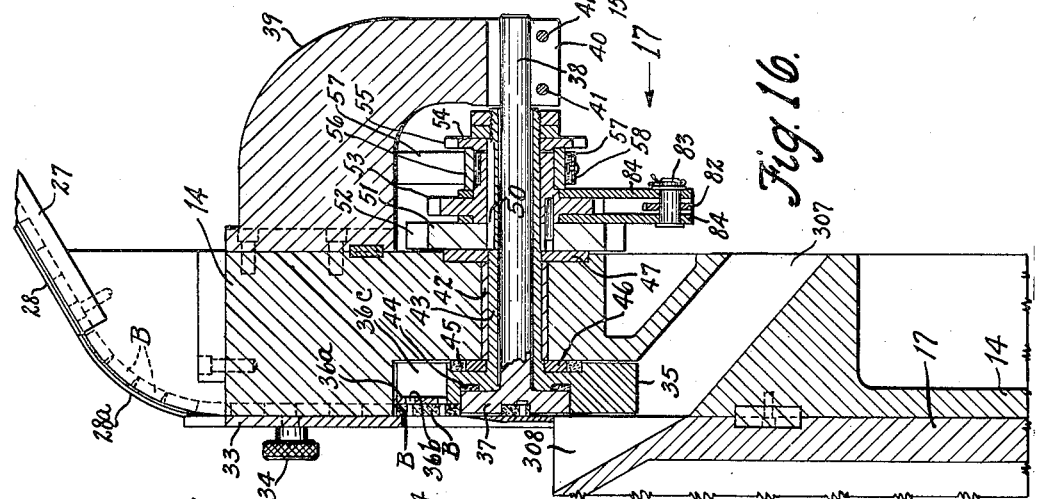
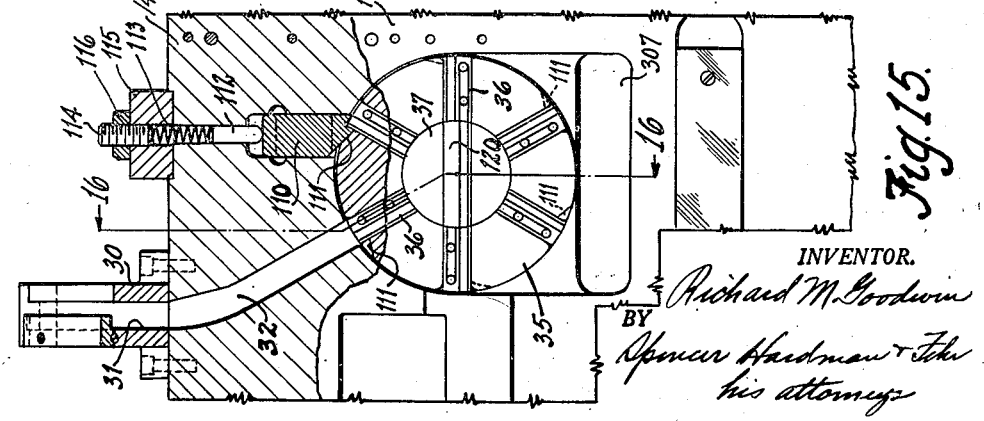

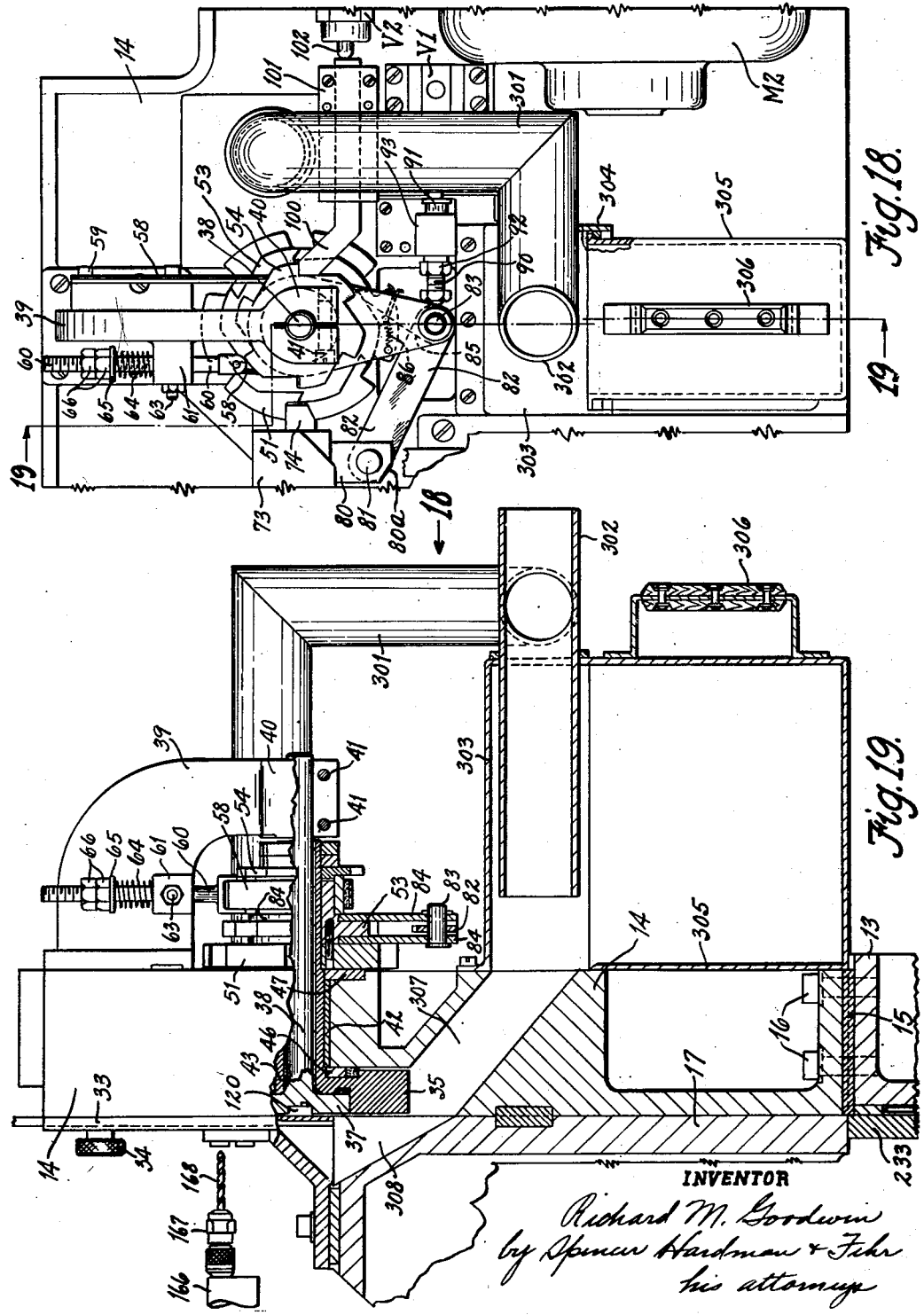

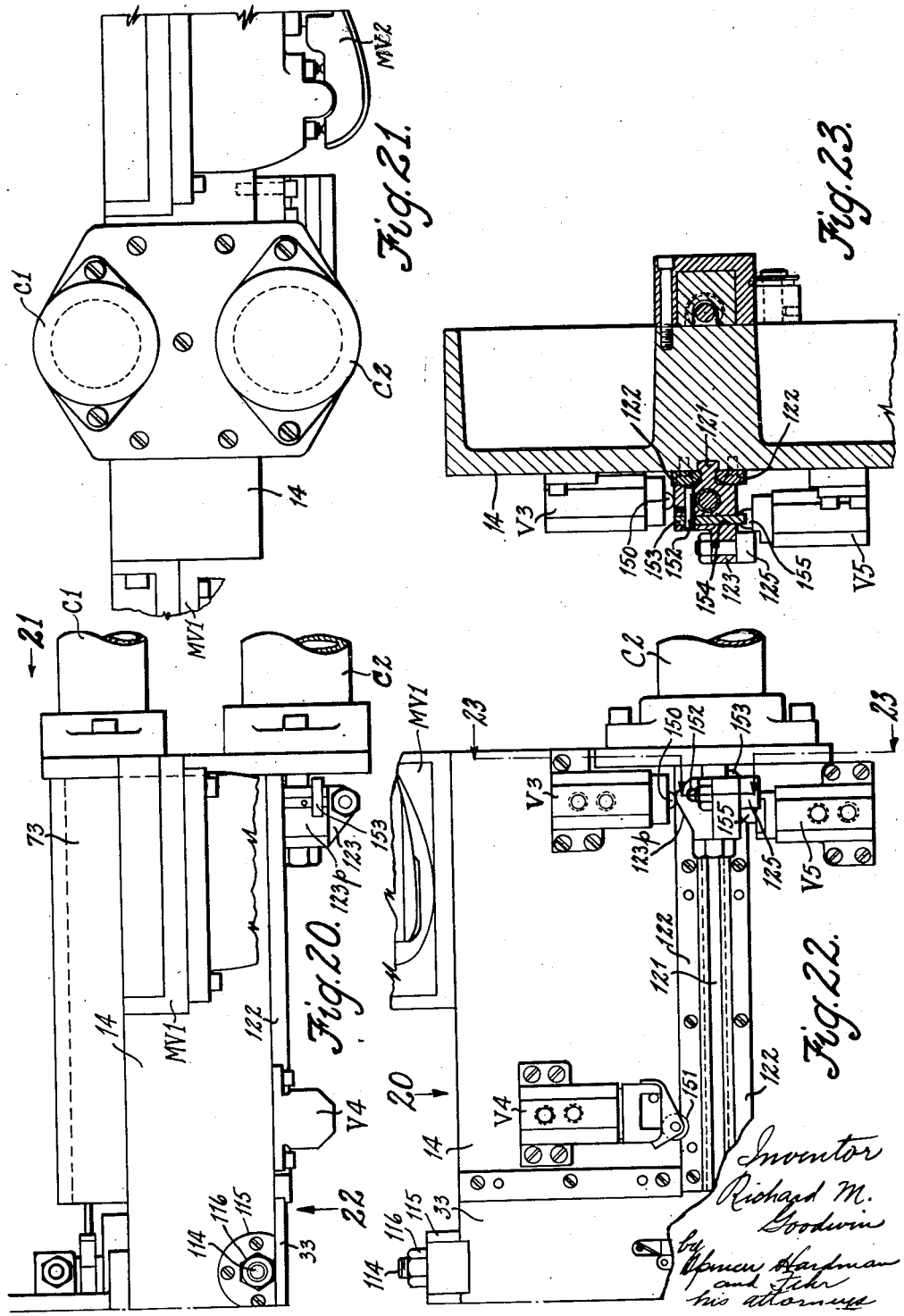

Feb. 17, 1953 R. M. GOODWIN 2,628,511
DYNAMO BRUSH MACHINE
Filed Sept. 30, 1948 21 Sheets-Sheet 13
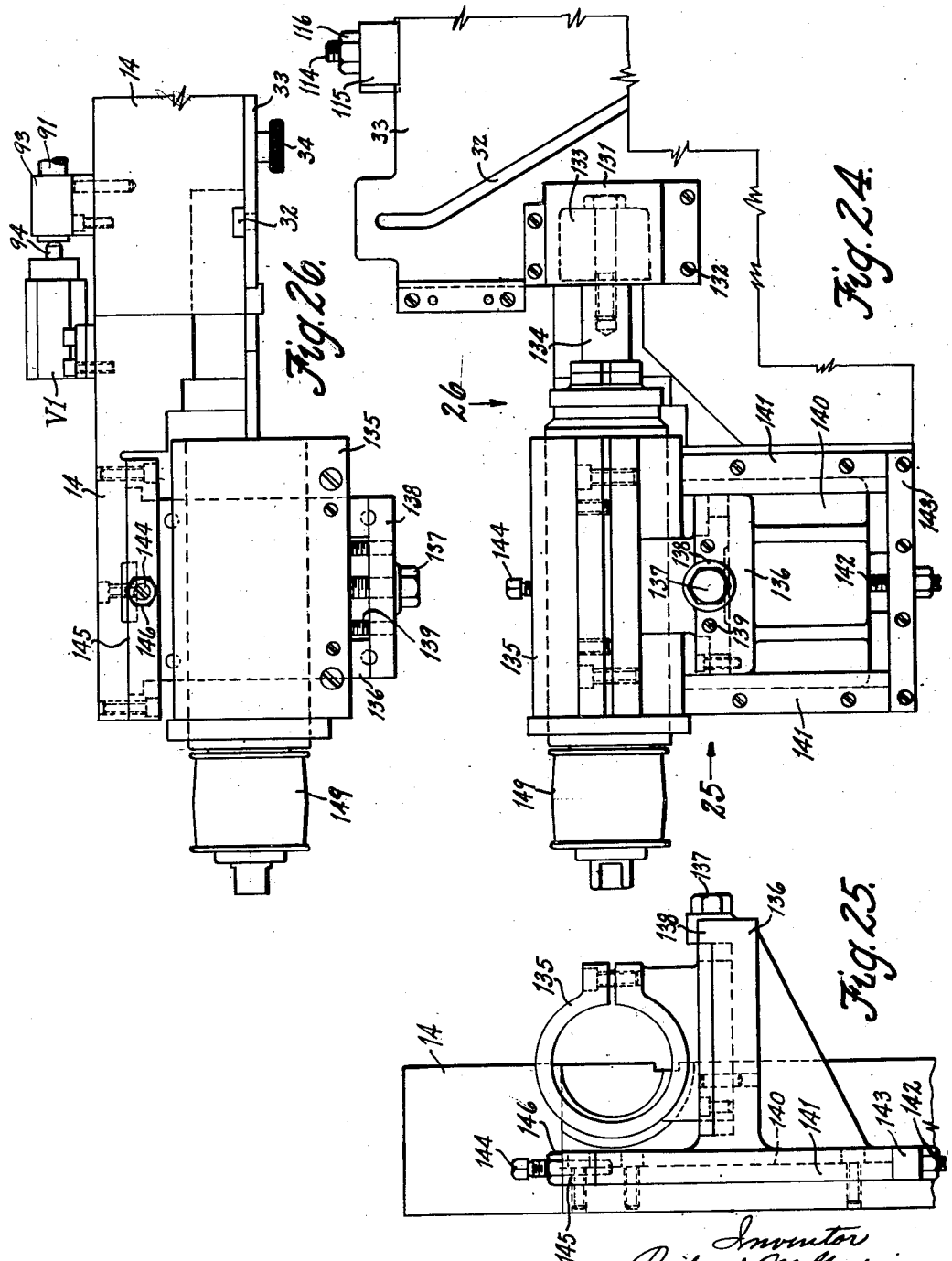

INVENTOR
Richard M Goodwin
by Spencer Hardman & Fehr
his attorneys

Feb. 17, 1953 R. M. GOODWIN 2,628,511
DYNAMO BRUSH MACHINE
Filed Sept. 30, 1948 21 Sheets-Sheet 15
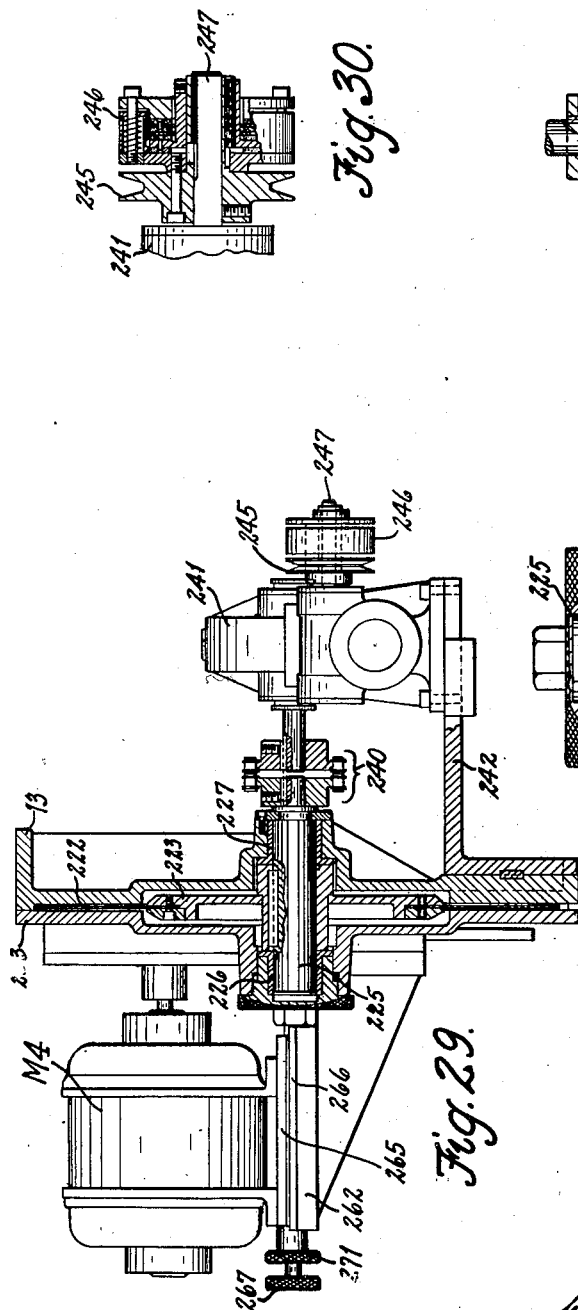
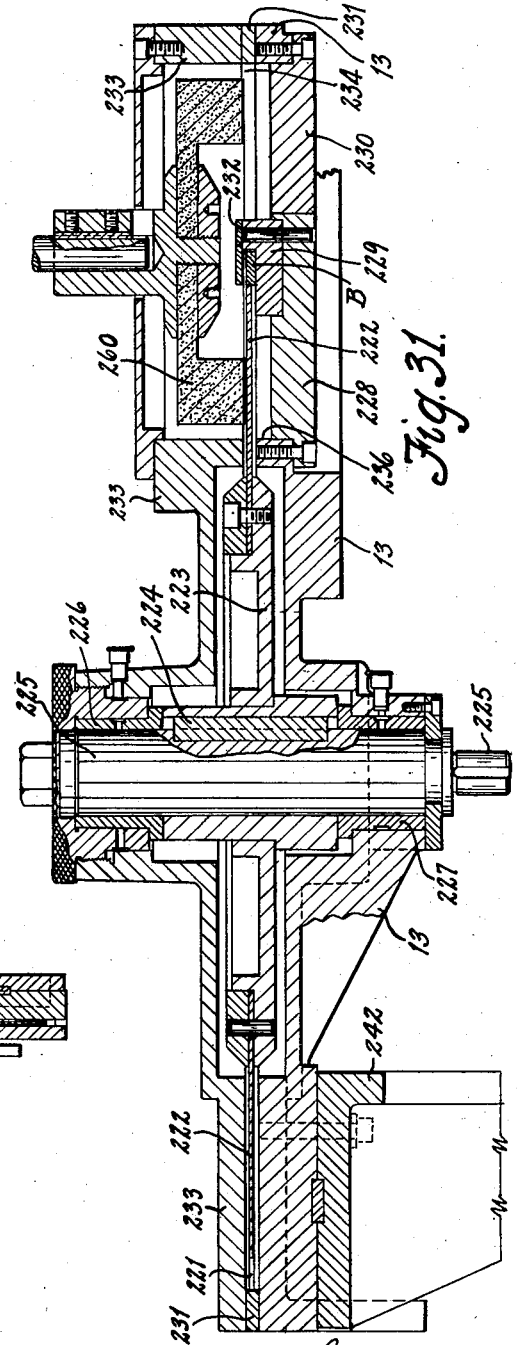
Inventor
Richard M. Goodwin
by Spencer Hardman & Fehr
his attorneys Feb. 17, 1953　　　　R. M. GOODWIN　　　　2,628,511
DYNAMO BRUSH MACHINE
Filed Sept. 30, 1948　　　　　　　　　　21 Sheets-Sheet 16

INVENTOR.
Richard M. Goodwin
by Spencer Hardman & Fehr
his attorneys

Feb. 17, 1953  R. M. GOODWIN  2,628,511
DYNAMO BRUSH MACHINE
Filed Sept. 30, 1948  21 Sheets-Sheet 17

Inventor
Richard M. Goodwin
by Spencer Hardman & Fohr
his attorneys

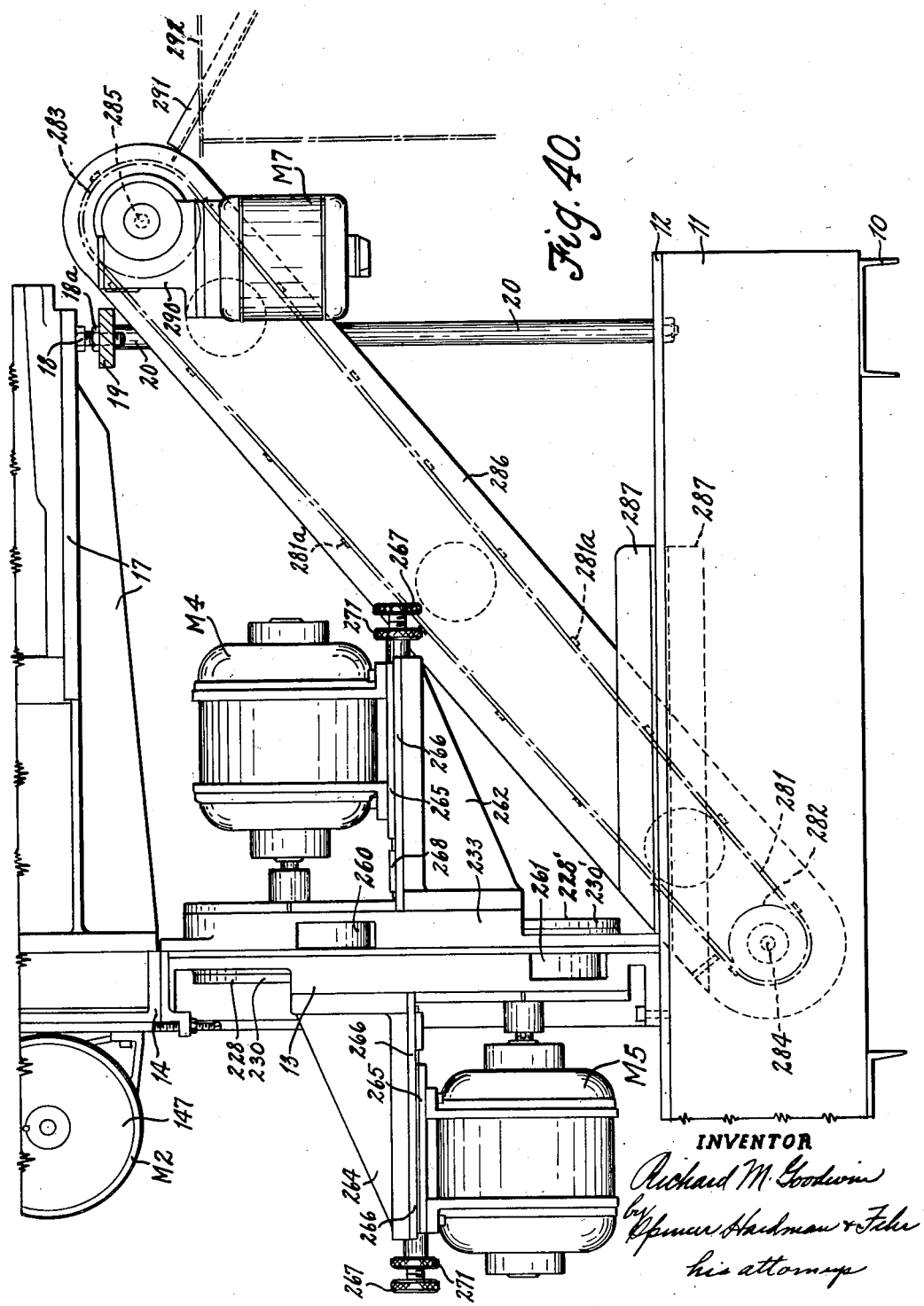

Feb. 17, 1953   R. M. GOODWIN   2,628,511
DYNAMO BRUSH MACHINE
Filed Sept. 30, 1948   21 Sheets—Sheet 20

INVENTOR
Richard M. Goodwin
by Spencer Hardman & Fehr
his attorneys

Feb. 17, 1953 R. M. GOODWIN 2,628,511
DYNAMO BRUSH MACHINE
Filed Sept. 30, 1948 21 Sheets-Sheet 21

INVENTOR
Richard M. Goodwin
by Spencer Hardman & Fehr
his attorney

Patented Feb. 17, 1953

2,628,511

UNITED STATES PATENT OFFICE 2,628,511

DYNAMO BRUSH MACHINE

Richard M. Goodwin, Anderson, Ind., assignor to General Motors Corporation, Detroit, Mich., a corporation of Delaware Application September 30, 1948, Serial No. 52,006

9 Claims. (Cl. 77—5)

This invention relates to the manufacture of commutator brushes for dynamoelectric machines.

An object of the invention is to provide a machine which performs successively the operations of drilling holes through a brush, concave grinding of the commutator engaging surface of the brush and parallel grinding of the side surfaces.

In the disclosed embodiment of the invention, the brushes descend from a hopper feed through a chute which terminates at a dial having pockets, each of which receives two brushes from the chute. At one station of the dial, the brushes are spot drilled for identification. In the next station, two holes are drilled. At a third station, the brushes are ejected from the dial and are passed under the surface of a grinding wheel for the concave grinding of the commutator engaging surfaces. From this grinder, the brushes pass down a chute and are engaged by grinding wheels which respectively grind side surfaces of the brushes. From these grinding wheels, brushes pass to a conveyor belt which carries the finished brushes to a box.

Further objects and advantages of the present invention will be apparent from the following description, reference being had to the accompanying drawings, wherein a preferred embodiment of the present invention is clearly shown.

In the drawings:

Fig. 6 is a fragmentary, enlarged, side view of parts shown in Fig. 5.

Fig. 7 is a fragmentary, top view in the direction of arrow 7 of Fig. 6.

Fig. 8 is a part of Fig. 5 enlarged, certain parts being shown in vertical section.

Fig. 9 is a sectional view on line 9—9 of Fig. 8.

Fig. 12 is a sectional view on lines 12—12 of Figs. 4 and 10.

Figs. 13 and 14 are sectional views, respectively, on lines 13—13 and 14—14 of Fig. 12.

Figure 1:
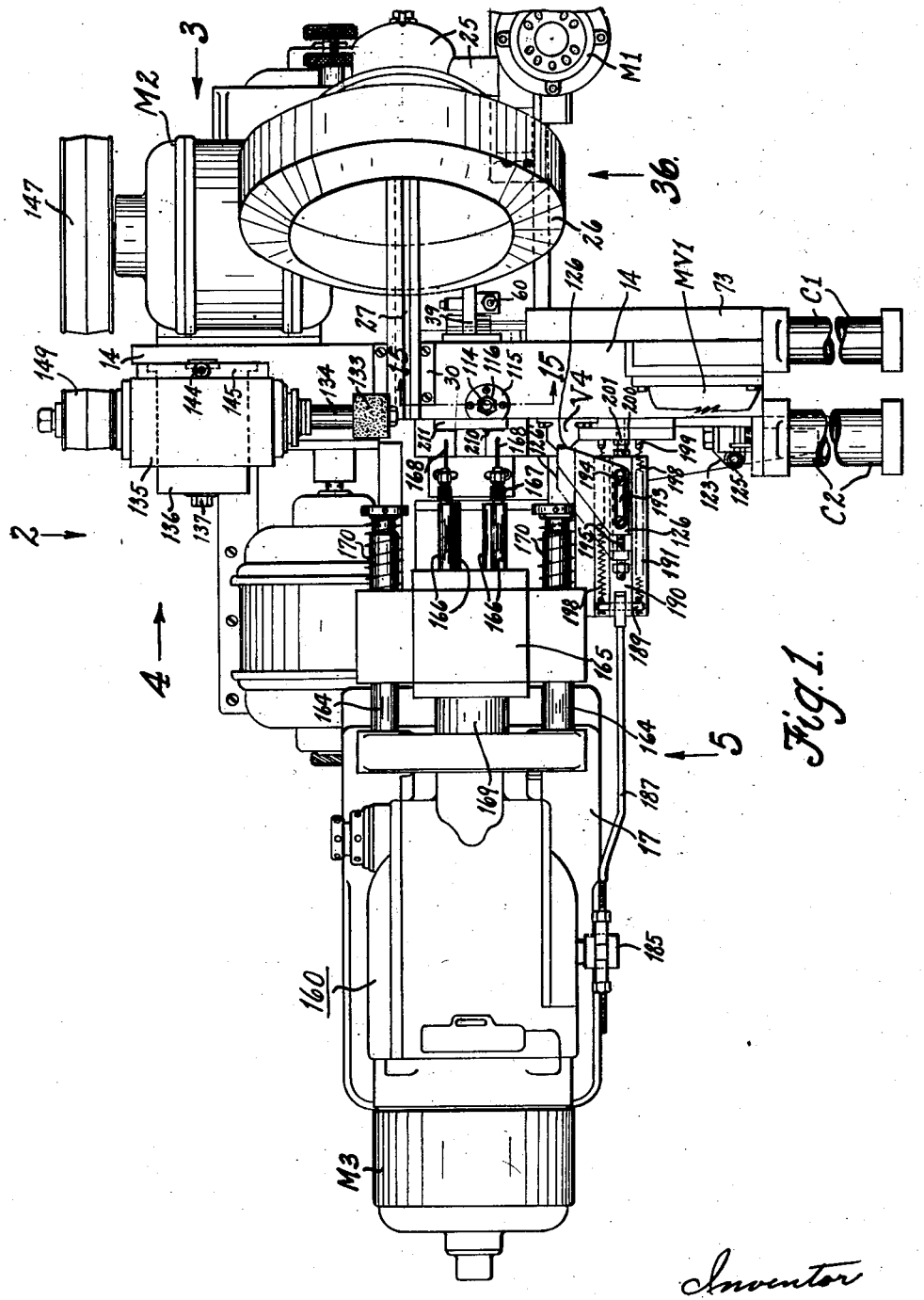
Fig. 1 is a plan view of the machine in the direction of arrow 1 of Fig. 5.
Figures 10, 11:
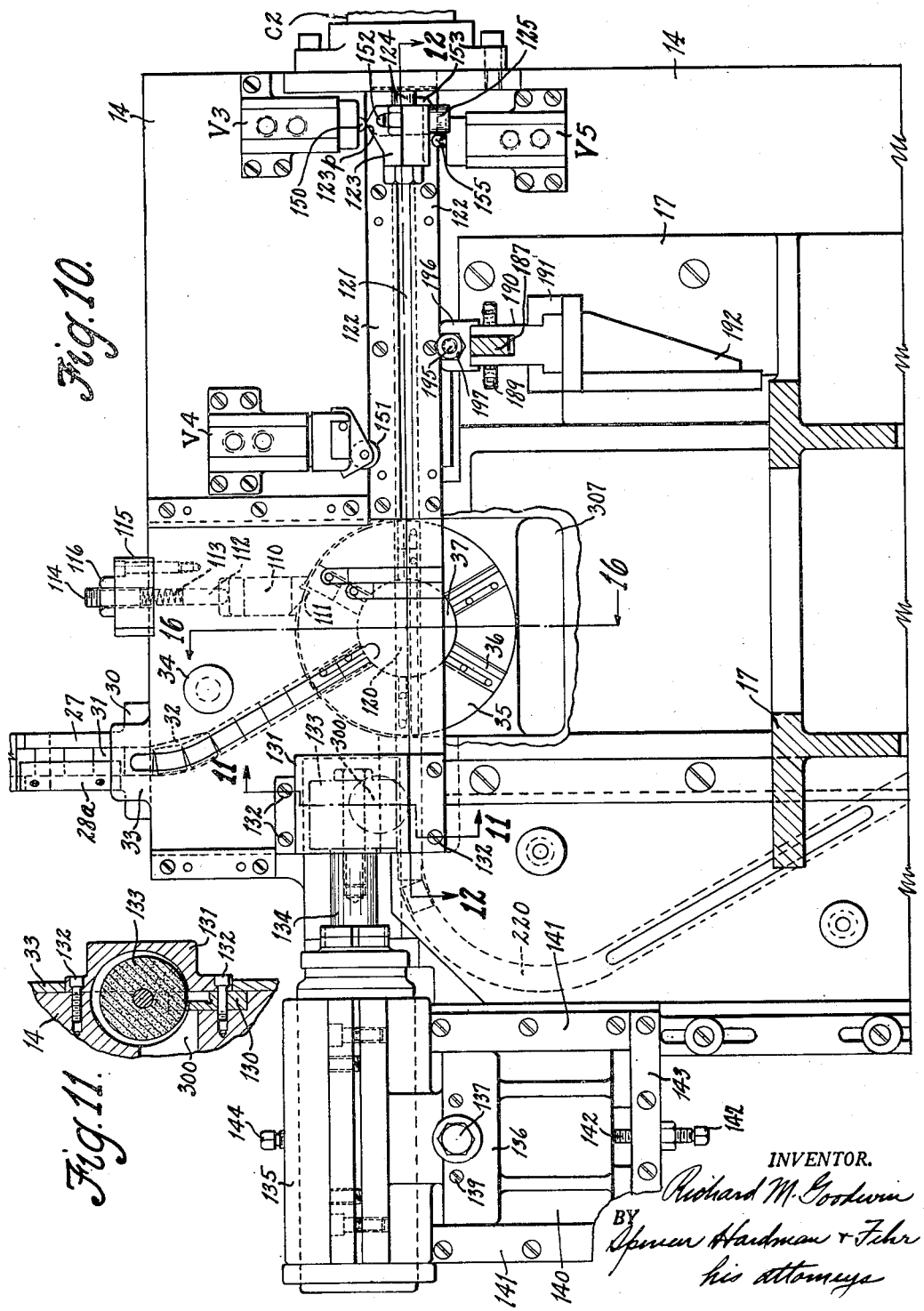
Fig. 10 is an enlargement of parts shown in Fig. 4.
Fig. 11 is a sectional view on line 11—11 of Fig. 10.

Fig. 15, which shows a part of Fig. 10, is a sectional view on line 15—15 of Fig. 1.

Fig. 16 is a sectional view on line 16—16 of Figs. 10 and 15.

Fig. 17 is a view in the direction of arrow 17 of Fig. 16.

Fig. 18 is a view similar to Fig. 17 and is in the direction of arrow 18 of Fig. 19.

Fig. 19 is a view, partly in section, on line 19—19 of Fig. 18.

Fig. 20 is a view in the direction of arrow 20 of Fig. 22 and shows parts shown in the lower portion of Fig. 1.

Fig. 21 is a view in the direction of arrow 21 of Fig. 20.

Fig. 22 is a view in the direction of arrow 22 of Fig. 20 and shows certain parts shown in Fig. 10.

Fig. 23 is a sectional view on line 23—23 of Fig. 22.

Fig. 24 is a view showing parts shown in Fig. 10.

Figs. 25 and 26 are views in the direction of arrows 25 and 26, respectively, of Fig. 24.

Figure 4:
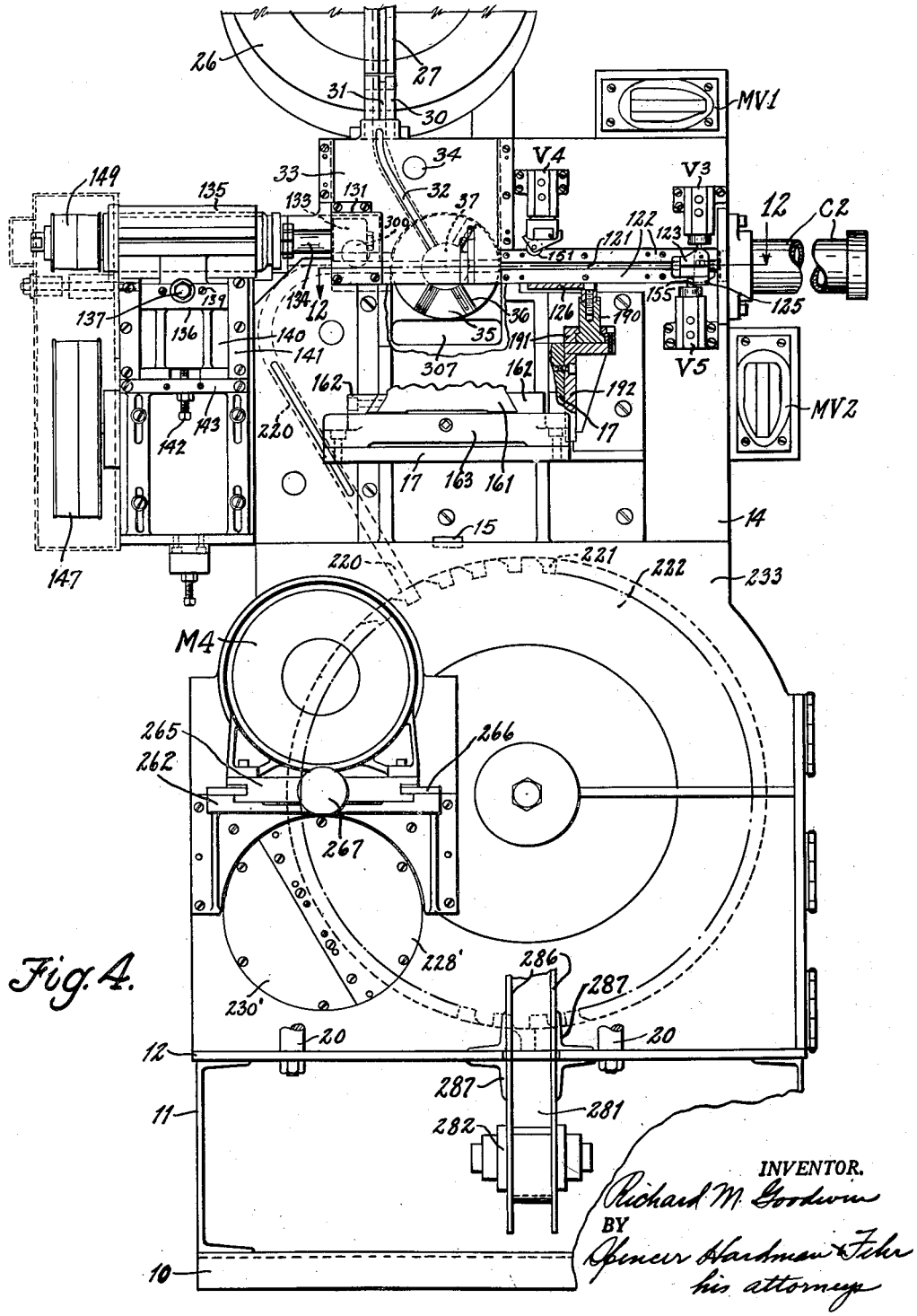
Fig. 4 is a view in the direction of arrow 4 of Figs. 1 and 2, certain parts being omitted.
Figure 27:
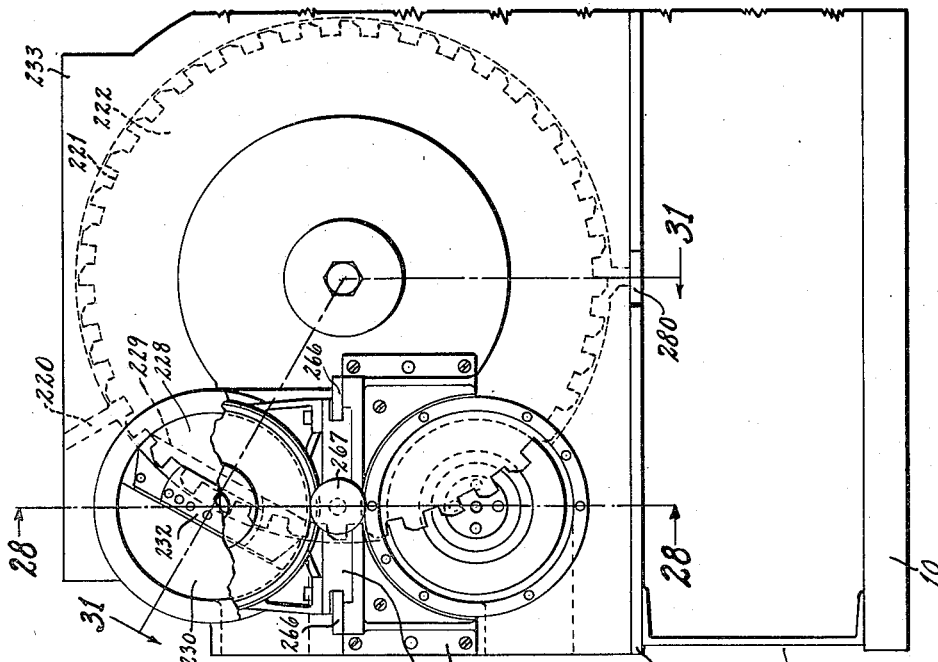

Fig. 27 is an enlargement of parts shown in Fig. 4, with certain housings removed.

Figure 28:
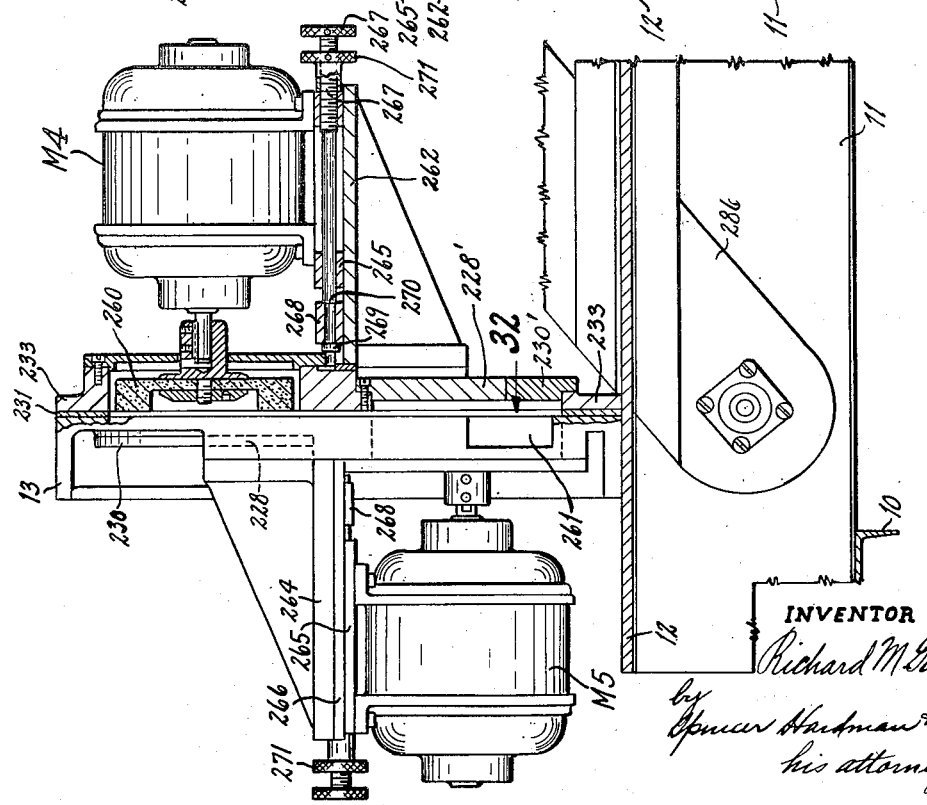

Fig. 28 is a sectional view on line 28—28 of Fig. 27.

Figure 3:
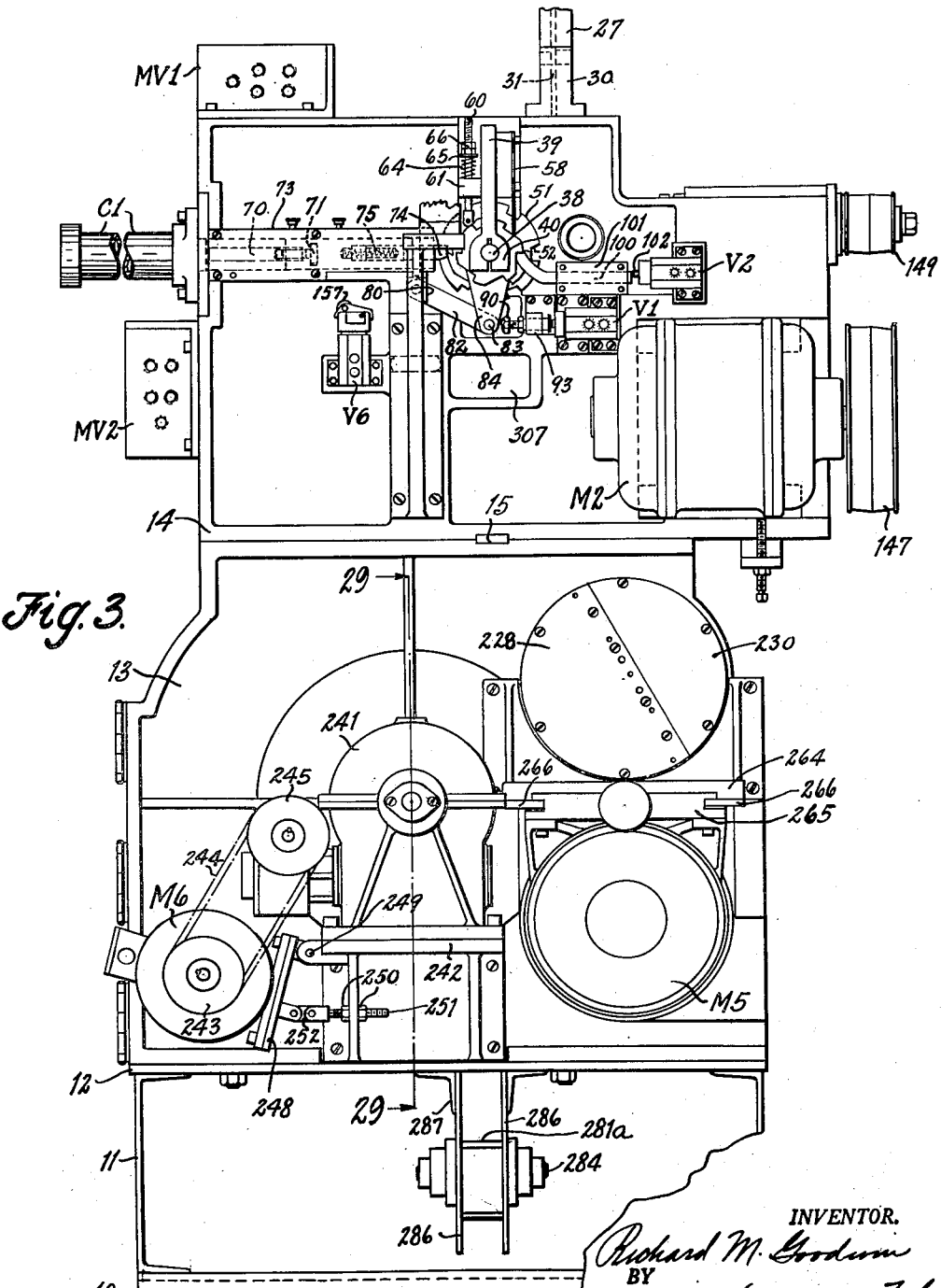
Fig. 3 is a view in the direction of arrow 3 of Figs. 1 and 2.

Fig. 29 is a sectional view on line 29—29 of Fig. 3.

Fig. 30 is a longitudinal, sectional view of the torque limiting clutch 246 of Fig. 29.

Fig. 31 is an enlarged, sectional view on line 31—31 of Fig. 27.

Figure 32:
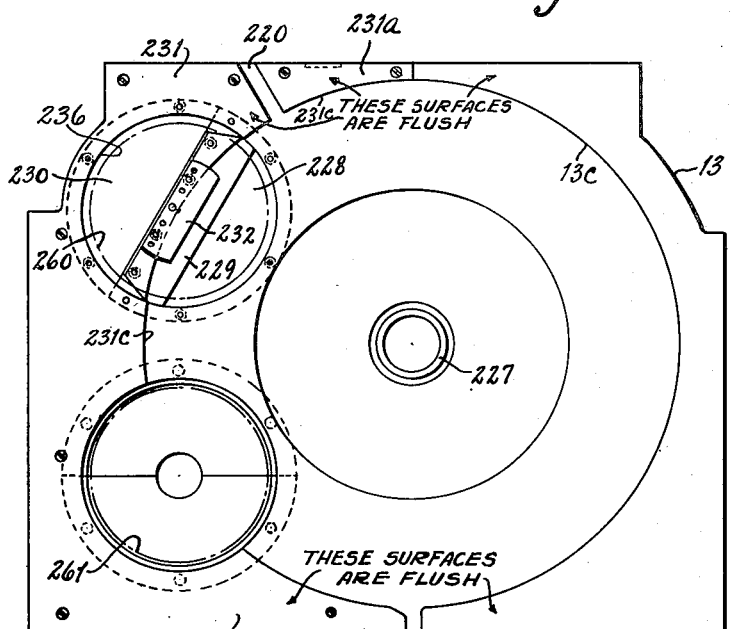

Fig. 32 is a view of part 13 in the direction of arrow 32 of Fig. 28 and parts 228—232 assembled therewith.

Figure 33:
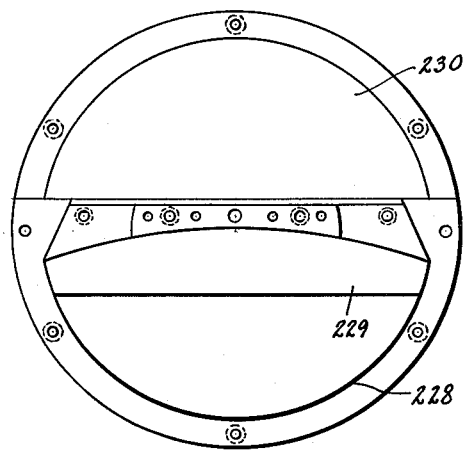

Fig. 33 is a view of parts 228 and 230 shown in Fig. 32.

Figure 34:
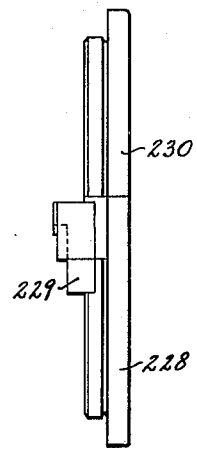

Fig. 34 is a view in the direction of arrow 34 of Fig. 33.

Figure 35:
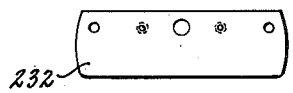

Fig. 35 is a view of part 229 shown in Fig. 32.

Figures 36, 37, 38:
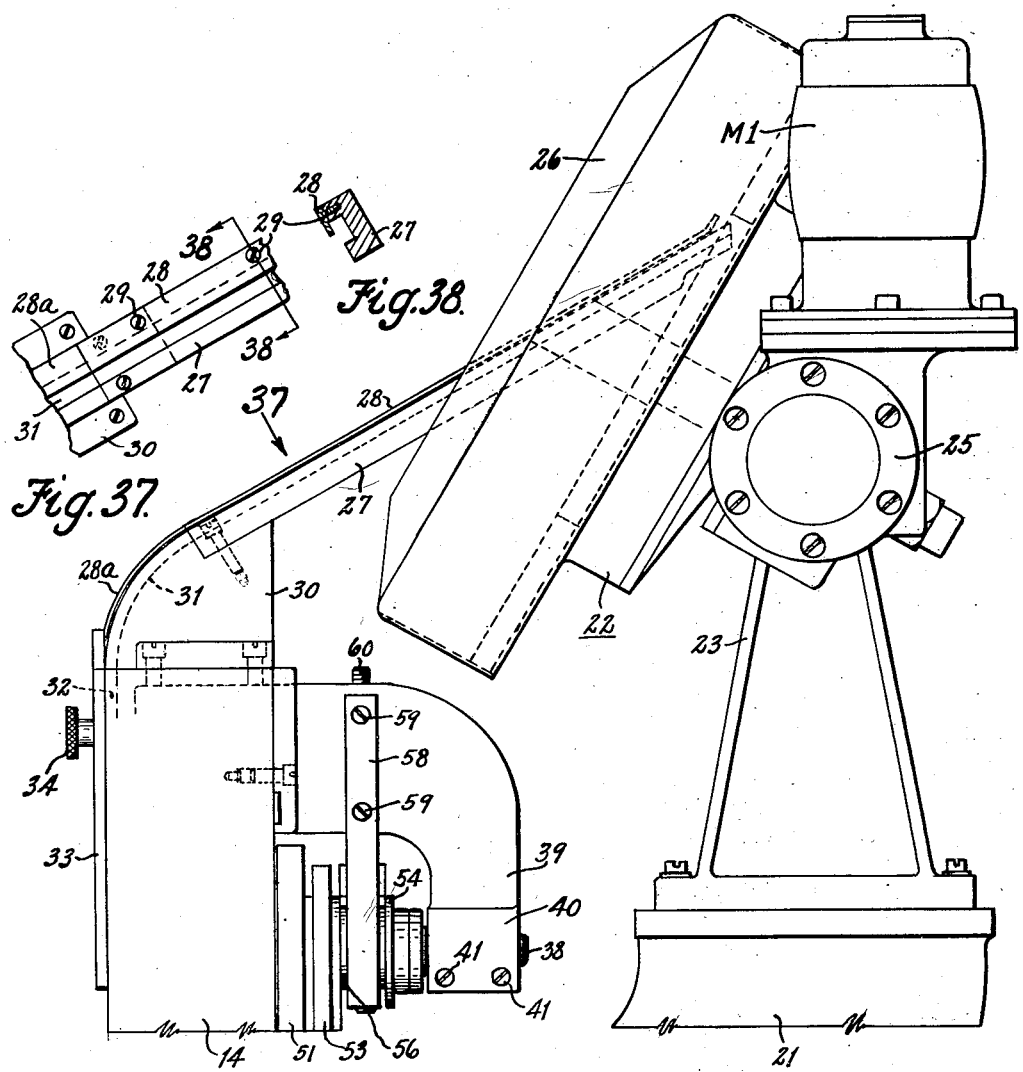

Fig. 36 is a view in the direction of arrow 36 of Fig. 1, and shows the hopper feed and its driving motor.

Fig. 37 is a fragmentary view in the direction of arrow 37 of Fig. 36.

Fig. 38 is a sectional view on line 38—38 of Fig. 37.

Figure 39:
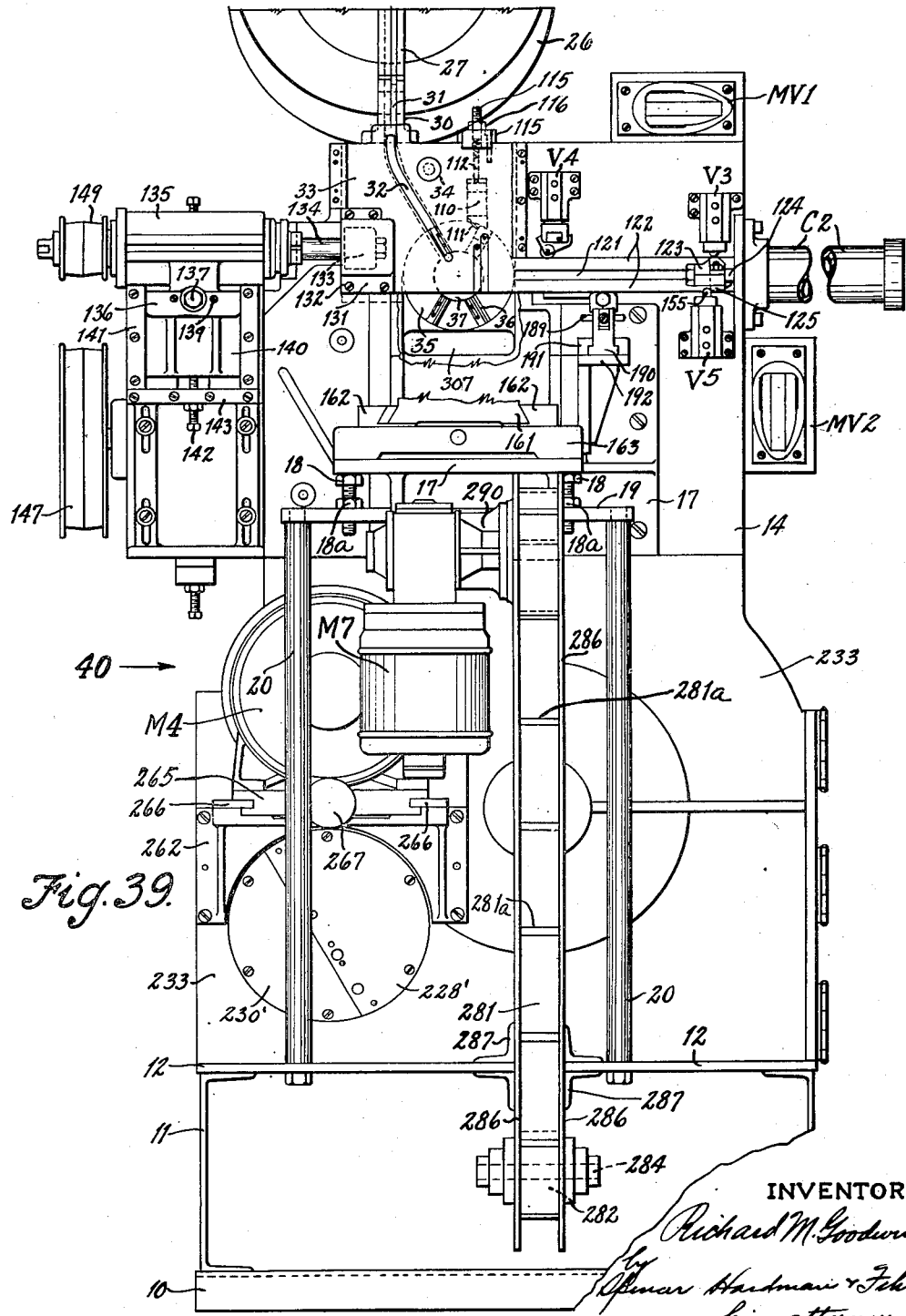

Fig. 39 is a view similar to Fig. 4 but with a conveyor belt added.

Fig. 40 is a view in the direction of arrow 40 of Fig. 39.

Figure 43:
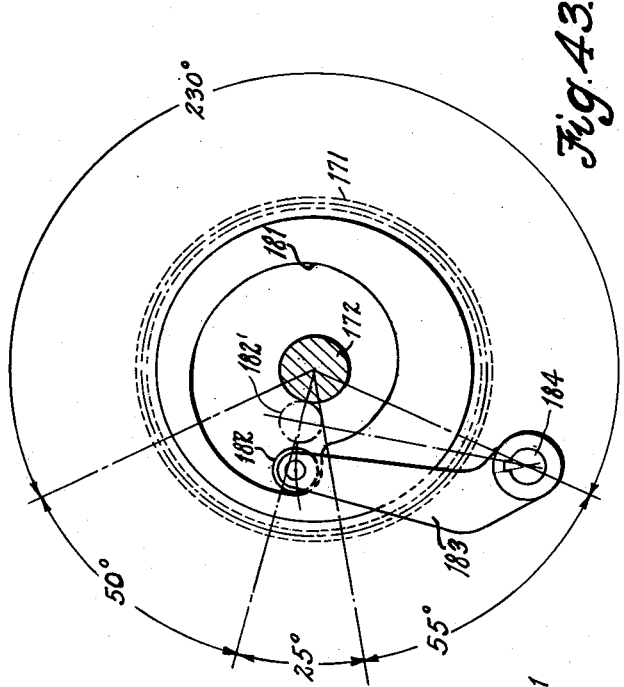
Figure 42:
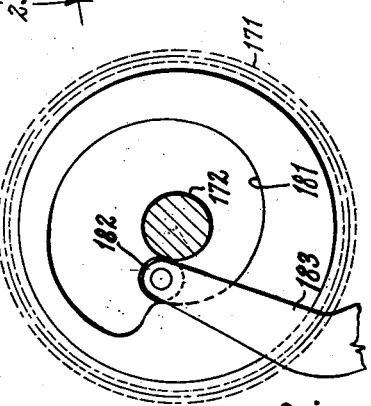
Figure 41:
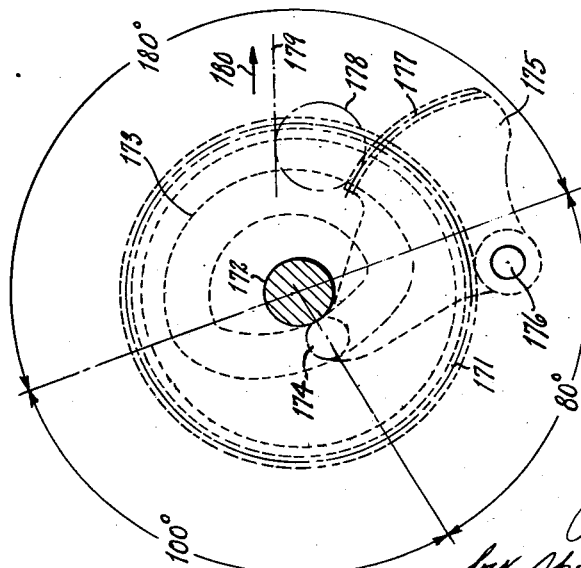

Figs. 41, 42 and 43 are diagrams of cam controlled mechanisms.

Figure 44:
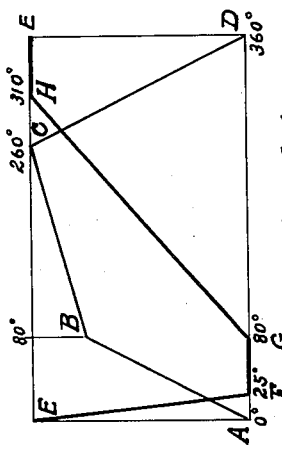

Fig. 44 is a timing chart.

Figures 45, 46:
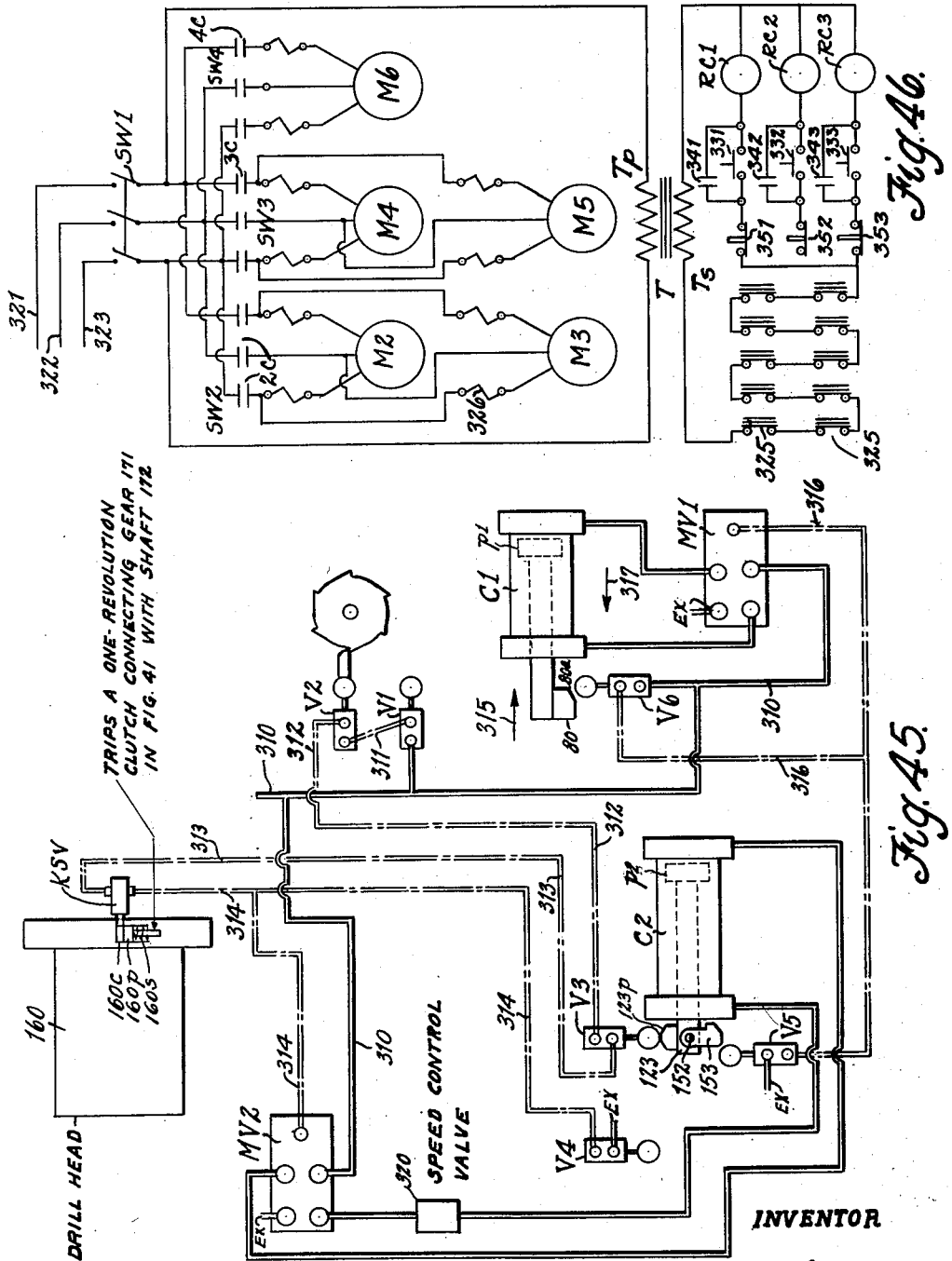

Fig. 45 is an hydraulic diagram.

Fig. 46 is an electrical diagram.

Referring to Fig. 3, the machine comprises base channels 10 supporting channels 11, which support a plate 12, which supports a lower frame 13, which supports an upper frame 14. As shown in Fig. 19, frames 13 and 14 are relatively located by keys 15 and secured by screws 16.

Referring to Fig. 40, a bracket or shelf 17 is supported at its left end by frame 14 and at its right end by screws 18 adjustably supported by cross bar 19 supported by rods 20 (Fig. 39) which are attached to plate 12. Screws 18 are adjusted so as to level shelf 17 and are secured by lock nuts 18a.

Figure 2:
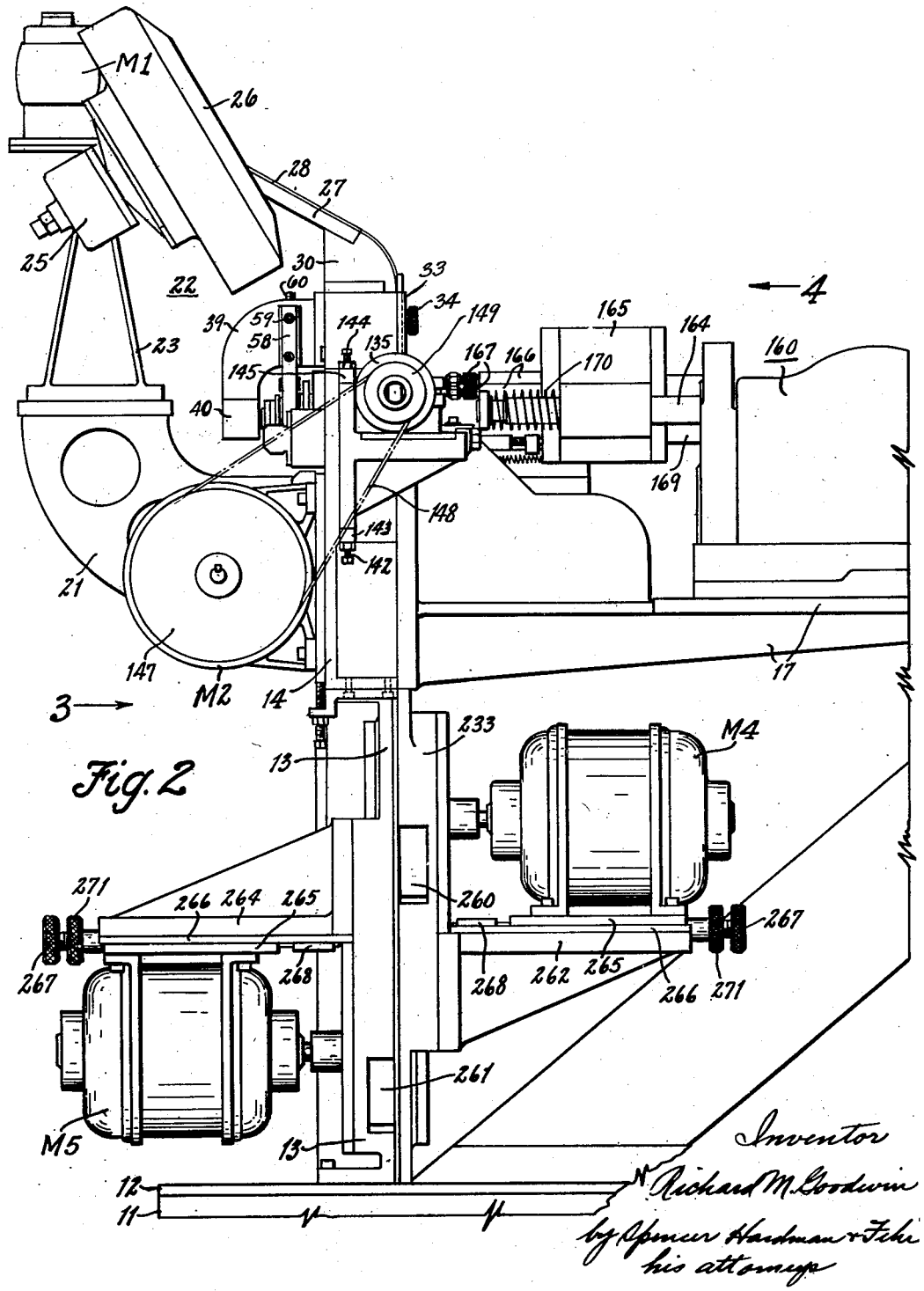
Fig. 2 is a fragmentary, side view in the direction of arrow 2 of Fig. 1.

As shown in Fig. 2, frame 14 supports a bracket 21 which supports a hopper feed unit 22 comprising a frame 23 supported by bracket 21, motor M1, housing 25 supported by frame 23 and containing speed reducing gearing for transmitting motion from the motor to the rotating hopper 26 which encloses a mechanism for picking up brushes from the bottom of the hopper and causing them to descend flatwise through a chute 27. As shown in Fig. 38, chute 27 provides a channel for receiving the brushes which are retained therein by a plate 28 secured to the chute by screws 29. Chute 27 is attached to a bracket 30 which is attached to frame 14 (Fig. 36). The bracket 30 provides a channel 31 which forms a continuation of the channel of the chute 27 and plate 28a extends over the channel 31.

From the channel 31 the brushes descend to a channel 32 in frame 14 (Fig. 15). This channel is covered by plate 33 which thumb screws 34 secure to the frame 14 (Fig. 16).

The brushes descend from channel 32 into pockets 36 which are provided by a dial 35, the center portion of which receives a disc 37 (Fig. 16) provided by rod 38 which is supported by a bracket 39 attached to frame 14 and is clamped thereto by providing the bracket with a split hub 40 receiving the rod 38, said hub being forced around the rod by screws 41 (Figs. 16, 17). Frame 14 provides a bearing 42 for receiving a tubular shaft 43 integral with the dial 35, and shaft 43 provides clearance for the rod 38 which is supported at its right end by bracket 39 and at its left end through the engagement of disc 37 with the recess in the central part of the dial 35. Dial 35 supports a seal ring 44 located between the dial and disc 37; and a seal ring 45 located around a metal disc 46 supported by the dial shaft 43. Frame 14 supports a disc 47. Discs 46 and 47 fit against the ends of bearing 42 so as to exclude dust and grit therefrom. In Fig. 16, brushes B, B are shown in one of the pockets 36 of the dial. The back wall 36a of pocket 36 is provided with holes 36b through which drills forming holes in the brushes, may extend. The particles of carbon or other brush material are received in a pocket 36c and, as the dial rotates, the pockets discharge their contents through a chute 307 in frame 14.

A key 50 (Fig. 16) secures to shaft 43 a disc 51 having notches 52 (Fig. 17), a ratchet 53 and a disc 54 having notches 55. The hub of ratchet 53 is keyed to a brake drum 56 engaged by a brake lining 57 attached to a brake band 58 which, together with the lining, is secured by screws 59 to bracket 39. The other end of the band 58 is attached to a rod 60 passing through a lug 61 of bracket 39 and having a longtitudinal groove 62 received by a screw pin 63 which prevents rotation of the rod. The rod is urged upwardly by a spring 64 bearing against a washer 65 retained by nuts 66 on the rod. By adjusting these nuts, a suitable brake pressure is applied through the spring 64.

Figure 5:
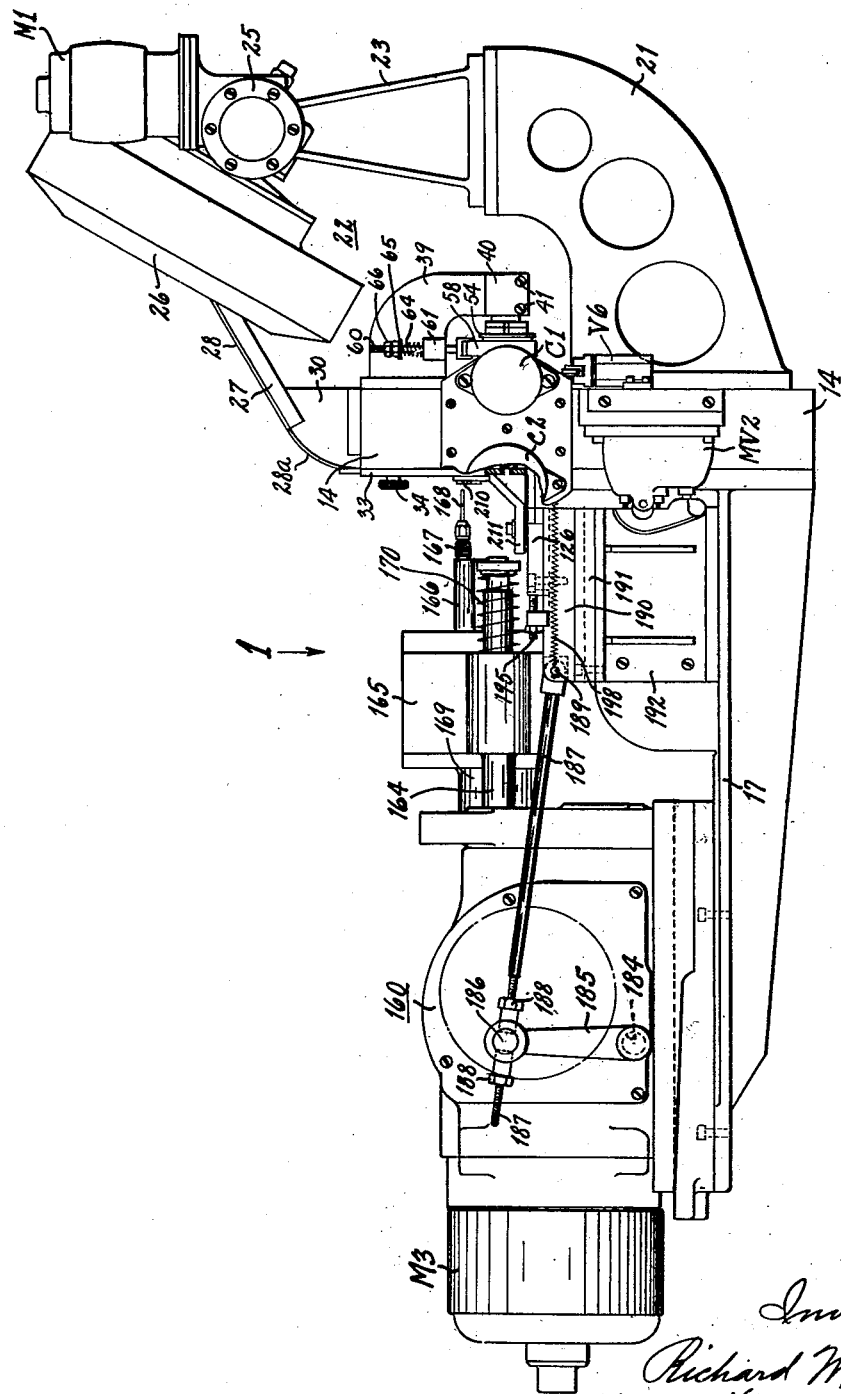
Fig. 5 is a side view of the upper part of the machine in the direction of arrow 5 of Fig. 1.

A cylinder C1 (Figs. 1, 5 and 12) contains a piston attached to a rod 70 threadedly connected with a T-bar 71 attached to a slide 72 which is guided by bracket 73 attached to frame 14. Slide 72 guides a locking bar 74 engageable with notches 52 of disc 51 and urged therein by spring 75. Bar 74 is retained by a pin 76 attached to guide 72 and received by a slot 77 in bar 74. As shown in Figs. 13 and 17, guide 72 provides a lug 80 connected by pin 81 with a link 82 connected by pin 83 with lever arms 84 pivotally supported by the hub of ratchet 53 (Figs. 16 and 17). During left movement of slide 74, surface 80a of lug 80 is engageable with roller 157 of valve V6, said roller being urged upwardly by a spring in said valve. The pin 83 pivotally supports a ratchet pawl 85 engageable with the teeth of ratchet 53 and urged toward the ratchet by a spring 86 connecting the pawl with the arms 84. Arms 84 are engageable with the head of a screw 90 threaded into a rod 91 and locked in the desired position of adjustment by a nut 92. Rod 91 is guided for axial movement by bracket 93 attached to frame 14 and is engageable with the plunger 94 of valve V1 (Fig. 17).

The toothed disc 54 (Fig. 18) is engageable with a bar 100 supported for horizontal sliding movement by bracket 101 attached to frame 14 and is engageable with plunger 102 with valve V2. Plungers 94 and 102 are urged left by springs, not shown, within the valve housings.

The correct location of the dial is effected by engagement of the bar 74 with the disc 51 as shown in Fig. 17; and, when the dial is thus correctly located, it receives a plate 110 (Fig. 15), said dial having notches 111 to receive the plate. Plate 110 is urged downwardly by a plunger 112 guided by frame 14 and receiving pressure from a spring 113 bearing against a screw 114 threaded into a block 115 and secured by a nut 116. Block 115 is attached to frame 14. The function of plate 110 is to locate the brushes so that the lower one is against the disc 37.

Disc 37 is provided with a cross slot 120 (Fig. 15) which is in alignment with the horizontal pockets 36 of the disc 35. When the brushes arrive at the horizontal position in the right horizontal pocket, they are located for ejection from the disc which is effected by a bar 121 (Figs. 10 and 12) which is guided for horizontal movement by rails 122 attached to frame 14. Bar 121 is attached to a block 123 (Fig. 12) which is attached to the rod 124 of a piston in the cylinder C2. The block 123 carries a roller 125 engageable with a cam 126 which, in a manner to be described, is moved automatically downward as viewed in Fig. 12 at a predetermined rate which determines the rate of movement of the slide 121 after the roller 125 has engaged the cam 126. When rod 124 moves left, the bar 121 pushes the brushes from right to left (Fig. 10) and out the left hand pocket 36 of the dial. As the brushes are pushed out they are received by a channel provided by a guide 130 (Fig. 11) supported by frame 14 and retained by a cover 131 secured to the frame by screws 132. The cover 131 together with the frame 14 enclose a grinding wheel 133 attached to shaft 134 supported by suitable bearings in a bracket 135 (Fig. 24) slidably supported for horizontal adjustment on a shelf 136 (Fig. 25). This adjustment is effected by the turning of a screw 137 passing through a flange 138 of shelf 136 and threadedly connected with the base of the bracket 135. When the adjustment has been made, the bracket 135 is fixed by screws 139 (Fig. 26) threaded through the flange 138 and bearing against the bracket 135. Shelf 136 is integral with a vertical plate 140 guided for vertical movement by rails 141 attached to frame 14. Plate 140 is adjusted vertically by turning a screw 142 threaded through a bar 143 attached to frame 14 and is locked in adjusted position by screw 144 threaded through a plate 145 attached to frame 14 and secured and locked by nut 146.

As the brushes are forced by the bar 121 through the guide 130 (Fig. 11), they move successively under the grinding wheel 133 and then out into a channel 220 through which they gravitate to side surface grinding wheels to be described. During movement of the ejector bar 121 (Fig. 10), the block 123, to which it is attached, has a projection 123p for engaging the plunger 150 of a valve V3 and also for engaging the roller 151 of a valve V4, said plunger and roller being urged down by springs, not shown, in the valves. As shown in Figs. 10 and 23, the block 123 carries a pin 152 pivotally supporting a lever 153 which is shown in Fig. 12 located in a notch 154 of block 123. Therefore the lever 153 can move only counterclockwise from the position shown in Figs. 10 and 22. Therefore during right movement of the block 123, lever 153 is effective to operate upon the plunger 155 of a valve V5 but will ride over this plunger without operating it during left movement of the block 123. Plunger 155 is urged upwardly by the spring in the valve V5.

Referring to Fig. 1, motor M2 supported by frame 14 is connected through pulley 147, belt 148 and pulley 149 with the shaft 134 which operates grinder wheel 133.

The holes are spotted and drilled through the brushes by what is known as a Kingsbury drill head 160 (Figs. 1 and 5) operated by motor M3. The frame of head 160 has a dovetail 161 (Fig. 4) guided by rails 162 supported by a plate 163 supported by shelf 17. The head 160 is adjustable along shelf 17 and is fixed thereto in the desired position of adjustment. The head 160 provides horizontal rods 164 (Fig. 1) which guides the drill support 165 having four spindles 166 each for supporting a drill chuck 167 and a bit 168. Drill support 165 is connected with a sleeve 169 which is moved horizontally by a mechanism housed in the head 160. Springs 170 assist in retracting the drill support 165. Motor M3 is connected by a speed reducing gearing (not shown) with a worm gear 171 (Figs. 6 and 41) connected by a one-turn clutch (not shown) with a shaft 172 which drives a recessed cam 173 receiving a follower 174 connected with a lever 175 pivoted at 176 and providing a gear segment 177 meshing with a gear 178 which operates a rack represented by dot-dash line 179 connected with sleeve 169. Arrow 180 indicates the movement of the rack to feed the drills toward the brushes. In Fig. 44, line A—B—C—D represents advancing and retracting movement of the drills. Line A—B represents relatively rapid advance at 80°. Line B—C represents 180° of gradual movement of the drill head as the drills pass through the brushes. Line C—D represents 100° of rapid retraction of the drills.

Shaft 172 drives a recessed cam 181 which is engaged by a follower 182 carried by a lever 183 connected with a shaft 184 on which lever 185 is mounted. Shaft 184 (Figs. 5 and 6) is connected with lever 185, the free end of which pivotally supports a pin 186 through which there passes a rod 187 whose location relative to the pin 186 is determined by nuts 188 threaded on rod 187, said pin 186 being located between adjacent ends of the nuts. Rod 187 is connected by a pin 189 with a slide 190 (Figs. 6, 7, 12) guided by rails 191 and supported by a bracket 192, attached to shelf 17. Slide 190 supports cam 126 (Fig. 12) which is provided with a slot 193 for receiving screws 194 passing through the slot and threaded into the slide 190. Adjustment of the cam 126 is effected by a screw 195 threaded through a block 196 of slide 190 and locked by nut 197. The screws 195 abuts the cam 126. Motion of the slide 190 and cam 126 toward the right in Fig. 8 or up in Fig. 12 is effected by springs 198 connected with pin 189 and with screws 199 threaded into shelf 17. Motion of the cam 126 toward the path of roller 125 is limited to a screw 200 threaded into shelf 17 and locked by nut 201. Screw 200 is engaged by the slide 190. Slide 121 (Fig. 10) moves at a certain rate by fluid pressure in cylinder C2 until roller 125 engages cam 126; and then the speed of slide 121 is reduced because it is under control by cam 126 which is under control by cam 181 (Fig. 42). The motion of cam 126, as controlled by cam 181, is represented by line E—F—G—H (Fig. 44). Line E—F represents a 25° movement of the cam 181 during which the cam 126 is permitted to advance into the position shown in Fig. 12. Line F—G represents a dwell for 55°. Line G—H represents gradual retraction of the cam 126 for 230°; and line H—E represents dwell for 50°. While brushes above those in the horizontal pockets of dial 135 are being drill-spotted and drilled through, cam 126 is moving toward the left (Fig. 1) from the path of movement of roller 125, thereby limiting the speed at which the ejector bar 121 can move left (Fig. 10) to push the brushes past the grinding wheel which grinds the commutator engaging surfaces thereof. When at 80° of revolution of shaft 172 (Fig. 44), the advancing of the drills changes from a rapid rate to a slower rate, cam 181 (Fig. 43) begins to control the position of cam 126 (Fig. 1). The bar 121 is not allowed to complete its advancing movement until shaft 172 has rotated 310°; and, during that period represented by line G—H (Fig. 44), the drills have drilled holes in the brushes and have been retracted sufficiently to clear the dial. Before 310° the two brushes that were ejected from the dial have been pushed through the guide 130 (Fig. 11) and have been grounded by the wheel 133 (Fig. 1). At about 310°, valve V4 (Fig. 4) is actuated to effect retraction of the bar 121; and, when it has cleared the dial, the dial is indexed automatically in a manner to be described. Consequently, no indexing can occur until after the drills have cleared the dial and the bar 121 has cleared the dial. As the bar 121 is retracted, the spring 198 (Fig. 1) returns the cam 126 to its starting position from the position 126' which it had when the ejection stroke of the bar 121 ended, said return being permitted by cam 181 which allows roller 182 to move to 182' in Fig. 43 which is the position of roller 182 in Fig. 42.

As shown in Fig. 12, the drills are guided while operating upon the brushes by bushings 210 mounted in a plate 211 which is supported by shelf 17 as shown in Fig. 8.

After the brushes have been passed under the grinding wheel 133, they pass down a channel 220 (Figs. 4 and 10) which is provided in part by frame 14 in part by frame 13. From the lower end of channel 220 (Fig. 27) the brushes descend into notches 221 provided by a feed disc 222 having a hub 223 attached by key 224 to a shaft 225 journaled in bearings 226 and 227 (Fig. 31) supported by frame 13 and a frame 233 attached thereto with spacers 231 and 231a between. The disc 222 receives a brush B (Fig. 31) and moves it in a channel or annular brush guide bounded on its sides by parts 13 and 233 (left part of Fig. 31) and by cylindrical surfaces 13c of parts 13 and 231c of parts 231 and 231a (Fig. 32). When these parts are interrupted by pockets 234 (right part of Fig. 31) and for grinding wheels, this annular brush guide is continued by a plate 229 attached to the cover member 228 and a plate 232 attached to plate 229 (Figs. 31 and 32). Cover members 228 and 230 are circularly segmental in contour. Member 228 subtends an arc greater than 180° and member 230 less than 180°. Together, the members 228 and 230 provide a disc having a cylindrical portion which closes a hole 236 in frame 13. If cover member 230 is removed, cover member 228 can be slid edgewise so that plate 232 will clear the disc 222 and the cover member 228 can be removed from the hole 236 to permit access to a grinding wheel 260 (Fig. 31) represented by dot-dash circle 260 in Fig. 32. As shown in Fig. 40, cover members 228' and 230' attached to frame 233, close a pocket which receives wheel 261 represented by a dot-dash circle 261 in Fig. 32.

The shaft 225 is connected by coupling 240 with a speed reducer contained in a housing 241 mounted on a shelf 242 supported by frame 13. Referring to Fig. 3, a motor M6 drives a pulley 243 connected by a belt 244 with a pulley 245 which, as shown in Fig. 30, is connected by a torque limiting clutch 246 with a shaft 247 which is the input shaft of the speed reducer. In case a brush jams while being conveyed by the disc 222, the clutch 246 yields to present excessive transmission of torque. Belt 244 is tightened by adjustment of the bracket 248 which supports motor M6 relative to pivot 249 provided by shelf 242, said adjustment being effected by adjustment of nuts 250 on a screw 251 connected by a link 252 with bracket 248.

The disc 222 moves the brushes successively past the grinding wheels 260 and 261 (Fig. 40) driven, respectively, by motors M4 and M5 supported, respectively, by shelves 262 and 264 attached, respectively, to frames 233 and 13. Each motor is supported by a base 265 (Fig. 28) guided by rails 266 and having threaded engagement with a screw 267 which is supported by the base 265 and by a lug 268 of the supporting shelf, said lug receiving shoulders 269 and 270 of the screw whereby axial movement thereof is prevented. By turning the screw 267, the location of the grinding faces of the wheels can be adjusted. Screw 267 is locked in adjusted position by nut 271.

After the brushes are ground by the wheels 260, 261, they gravitate from the feed disc 222 through an opening 280 in plate 12 (Fig. 27) and fall upon a conveyor belt 281 (Fig. 40) passing around pulleys 282 and 283 pivotally supported on shafts 284 and 285, respectively, which are supported by plates 286 (Fig. 39) attached to angles 287, attached to plate 12. Plates 286 provide a channel between which lugs 281a on the conveyor pass. A motor M7 supported by a reduction gear housing 290 attached to the plate 286 drives the shaft 285 in a clockwise direction (Fig. 40). Brushes conveyed by the belt 281 gravitate upon a chute 291 and into a bin 292.

The housings of the grinding wheels can be connected with a dust exhaust system, for example, the housing for wheel 133 (Fig. 11) connected by a passage 300 in frame 14 and connected by duct 301 and duct 302 (Fig. 19) with the suction pipe of the exhaust system. Pipe 302 extends into a bracket 303 fastened to frame 14 and providing rails 304 for supporting the flanges of a box 305 having a handle 306. Bracket 303 is connected by a passage 307 in frame 14 and passage 308 in shelf 17. These passages conduct to the box 305 particles of brush material which are drilled out. The heavier particles are received by the box 305 and the lighter particles are drawn off through the duct 302.

Referring to Fig. 45, the indexing cylinder C1 is controlled by valve MV1 and the ejector cylinder C2 is controlled by valve MV2. The inlets of these valves are connected with a pressure line 310. At the end of indexing valves V1 and V2 are both open; and, if the ejector piston p2 has been fully retracted, valve V3 will be opened. Pressure line 310 will be connected through valve V1, pipe 311, valve V2, pipe 312, valve V3, and pipe 313 with valve KSV which admits pressure fluid to a cylinder 160c and causes movement of a piston 160p which trips a one-revolution clutch and causes shaft 172 to begin to turn for one revolution. Operation of valve KSV to admit air to cylinder 160c is followed by admission of air through valve KSV to pipe 314 and to a pilot pressure cylinder of valve MV2 to cause it to be conditioned for admission of pressure fluid to the right end of cylinder C2. The left end of cylinder C2 is connected with the exhaust EX of valve MV2 through a speed control valve 320 which so limits the rate of movement of piston p2 to the left that, in the event of failure of springs 198 (Fig. 1) to return cam 126 to control position, 25° of rotation of shaft 172 can take place, bringing cam 181 into the position shown in Fig. 42 for causing cam 126 to return to controlling position before the roller 125 (Fig. 1) engages cam 126. As piston p2 moves left, the bar 121 pushes brushes horizontally across the dial 35. When the ejecting movement of bar 121 is substantially controlled (only after the drills have been retracted from the dial), cam 123p (Fig. 22) engages roller 151 and valve V4 opens and connects line 314 with exhaust whereupon a spring in valve MV2 is released to reverse valve MV2 so that the piston p2 of cylinder C2 retracts or moves to the right, in Fig. 45, to retract the bar 121 from the dial. Near the end of this movement and sufficient to retract the bar 121, lever 153, not being able to move clockwise, trips or momentarily opens valve V5 to release fluid pressure in pipe 316, thereby conditioning valve MV1 for causing the piston p1 of cylinder C1 to move right as indicated by arrow 315 in order to retract the indexing mechanism preparatory to the next indexing operation. At the end of right movement of piston of cylinder C1, valve V6 is opened in order to admit pressure fluid through pipe 316 to the pilot pressure piston of valve MV1, thereby conditioning it for causing the piston p1 of cylinder C1 to move in the indexing direction or left as indicated by arrow 317.

The exhaust outlets of valves MV1, V4 and V5 are also indicated at EX. The apparatus provides for initiating the rotation of the drill head control shaft 172 (which effects advancement and retraction of the drills) and for initiating the ejecting movement of bar 121 only after indexing has been completed and for initiating the retraction of the bar 121 only after the drills have been retracted from the dial and for effecting the unlocking of the dial and retraction of the dial indexing pawl only after the bar 121 has been retracted from the dial and for effecting the indexing of the dial only after it has been unlocked. As a safety feature, valves V1, V2 and V3 are in series with valve KSV and pipe 314. If indexing has been completed, valve V1 (under control by the indexing pawl) is open and valve V2 (under control by the indexing ratchet) is open. Piston p2 in cylinder C2 must remain in position fully retracting bar 121 in order that valve V3 be open. This feature is present in order to be sure that piston p2 is at its extreme right position before rotation of drill head shaft 172 is started.

After piston p2 has started to move left (Fig. 45), valve V3 closes. The pilot air pressure in cylinder 160c is released by opening of the valve V4 at the end of left movement of piston p2 so that a spring 160s can return the piston 160p to normal position and the clutch trip of the head 160 is released so that shaft 172 will stop at the end of one revolution. The clutch and clutch trip are not shown as these are parts which are included with the Kingsbury drill head.

Referring to Fig. 46, a three-phase wire 321—322—323 is connected by manually operated switch SW1 with terminals of switches SW2, SW3 and SW4. Switch SW2 has three pairs of contacts 2c for making connection with motors M2 and M3 and switch SW3 has three pairs of contacts 3c for making connections with motors M4 and M5 and switch SW4 has three pairs of contacts 4c for making connection with motor M6. These pairs of contacts are closed respectively, in response to energization of relay coils RC1, RC2, RC3, which receive current from the secondary winding Ts of transformer T whose primary winding Tp is connected with wires 323 and 321 through switch SW1. The transformer secondary is connected with a series circuit which includes ten thermal overload circuit breakers 325, two for each of the five motors, each circuit breaker being heated by a heating element 326 in a motor lead. The relay coils RC1, RC2 and RC3 are energized in response to the closing of start switches 331, 332 and 333 respectively. When switches SW2, SW3 and SW4 are closed, contacts 341, 342 and 343 by-passing switches 331, 332 and 333 are closed by relays RC1, RC2 and RC3 respectively. These relays are deenergized respectively in response to the opening of stop switches 351, 352 and 353. If any one of the five motors become heated so that a thermal overload circuit breaker 325 opens, all the motors stop.

While the embodiment of the present invention as herein disclosed, constitutes a preferred form, it is to be understood that other forms might be adopted.

What is claimed is as follows:

1. A machine for drilling commutator brushes comprising a dial having pockets for receiving brushes, means for indexing the dial so that each pocket moves successively past loading, drilling and ejecting stations, a rotary drill at the drilling station, means for advancing and retracting the drill, means at the ejecting station for ejecting a brush from the dial, a fixed guide into which the ejecting means moves brushes from the dial and which guides the ejected brushes to apparatus which performs an operation upon them as they move in the guide and means operating after dial indexing for causing movement of the ejecting means at a relatively slow rate in the brush ejecting direction during the brush drilling operation and at a faster rate in the opposite direction after the brush drilling operation.

2. A machine for drilling commutator brushes comprising a fixed disc having a diametrically disposed cross groove, a dial rotatable around the disc and having an even number of radially arranged grooves, extending from the outer periphery of the dial to the disc, said disc closing ends of the dial grooves except those which are aligned with the cross groove of the disc, means for indexing the dial to locate its grooves successively at a loading station, a brush drilling station and at an ejecting station at which two of the dial grooves are aligned with the cross groove in the disc, brush drilling means at the drilling station, a pusher at the ejecting station for pushing a brush from one dial groove through the disc groove and through the diametrically opposite dial groove, a brush guide which receives brushes moved by the pusher away from the dial and guides them to apparatus which performs an operation upon them as they move in the guide, and means operating after dial indexing for causing movement of the pusher at a relatively slow rate in the brush ejecting direction during the brush drilling operation and at a faster rate in the opposite direction after the brush drilling operation.

3. A machine according to claim 2 in which the brush drilling means includes apparatus for advancing and retracting a drill with respect to the brush at the drilling station, and in which a mechanism under control by the drill advancing and retracting apparatus determines the rate of ejecting movement of the pusher.

4. A machine according to claim 2 further characterized in that the brush drilling means which includes apparatus for advancing and retracting a drill with respect to the brush at the drilling station, and by the inclusion of a pressure-fluid servo for actuating the pusher, a cam engaging member movable with the pusher, a cam engaged by the member during brush ejecting movement of the pusher and a mechanism under control by the drill advancing and retracting apparatus for determining the location of the cam.

5. A machine according to claim 2 further characterized in that the brush drilling means which includes apparatus for advancing and retracting a drill with respect to the brush at the drilling station, and by the inclusion of a pressure-fluid servo for actuating the pusher, a cam engaging member movable with the pusher, a cam engaged by the member during brush ejecting movement of the pusher, means guiding the cam for movement transverse to the path of movement of the pusher, a spring opposing movement of the cam by the member movable with the pusher, a second cam engaging member connected with said cam, and a second cam engageable with the second cam engaging member and operated in fixed relation to the drill advancing and retracting apparatus.

6. A machine according to claim 2 further characterized in that the brush drilling means which includes apparatus for advancing and retracting a drill with respect to the brush at the drilling station, and by the inclusion of a pressure-fluid servo for actuating the pusher, a cam engaging member movable with the pusher, a cam engaged by the member during brush ejecting movement of the pusher, means operating concurrently with the drill advancing and retracting apparatus for effecting control of the cam during the brush drilling operation and during retraction of the drill from the dial whereby the pusher continues brush ejecting movement until after the drill is retracted from the dial, means responsive to completion of the ejecting stroke of the pusher for causing the servo to return the pusher to its starting position, means responsive to completion of return movement of the pusher for causing operation of the dial indexing means and means responsive to completion of indexing for effecting operation of the drill advancing and retracting apparatus and the cam control means and for causing the servo to advance the pusher.

7. A machine for drilling commutator brushes comprising a dial having pockets for receiving brushes, means for indexing the dial so that each pocket moves successively past loading, drilling and ejecting stations, said indexing means including a fluid-pressure servo cylinder and piston, a pawl operated by the piston, a ratchet engaged by the pawl and connected with the dial, dial locking means including a notched disc connected with the dial and a latch connected with the piston and movable into a notch of the disc as the pawl is advanced by the piston to effect indexing, a drill head having a drill located at the drilling station and means for rotating the drill and means for advancing and retracting the drill and fluid-pressure controlled means for effecting a cycle of advancement and retraction of the drill, a brush ejecting bar for moving a brush out of the dial, a second fluid-pressure servo having a cylinder and a piston connected with the bar, a mechanism operated by the head in fixed relation to the drill advancing and retracting means to limit the ejecting movement of the bar by its servo to a rate such that said movement continues until after the drill is retracted from the dial, fluid-pressure distributing valves connected respectively with the servo cylinders, a pilot valve operated in response to completion of ejecting movement of the bar for conditioning the distributing valve of the bar servo to effect retraction of the bar, a pilot valve operated by the bar servo after the bar is retracted from the dial for conditioning the distributing valve of the index servo whereby the pawl and locking latch are retracted, a pilot valve operated in response to retractive movement of the pawl and latch for conditioning the distributing valve of the indexing servo to effect dial indexing and locking, and a pilot valve operated in response to completion of indexing for conditioning the fluid-pressure controlled means of the drill head to effect a cycle of advancement and retraction of the drill and for conditioning the distributing valve of the ejecting bar servo to effect brush ejecting movement thereof.

8. A machine for drilling commutator brushes comprising a dial having pockets for receiving brushes, means for indexing the dial so that each pocket moves successively past loading, drilling and ejecting stations, a machine frame supporting the dial and dial indexing means, a drill head unit attached to the frame and including a power operated drill and shaft and a mechanism operated by the shaft for causing the drill to advance and retract with respect to a brush located at the drilling station and a cam operated by the shaft and a member moved by the cam, an ejector bar for moving the brush at the ejecting station out of the pocket which contains it, means for causing ejecting movement of the bar and for causing movement of the bar to clear the dial, a cam follower moved by the bar, a cam engageable by the follower and guided by the frame for movement tranverse to the path of movement of the bar, means for connecting the member of the drill head unit mounted on the frame with the frame-supported cam, said drill unit cam being contoured to move the frame-supported cam into position for engagement by the follower as the bar moves in the ejecting direction and thereafter to retract the latter cam gradually to retard movement of the bar in the ejecting direction, said drill advancing mechanism operating during said retarded movement of the bar to move the drill into the brush and retract the drill therefrom, means rendered effective at the end of movement of the bar in the ejecting direction for causing the bar moving means to move the bar in the opposite direction, means rendered effective when the bar has cleared the dial for causing operation of the dial indexing means, a device for effecting a cycle of operation of the drill head shaft, and means rendered operative upon completion of indexing for causing operation of said device and for causing the bar moving means to move the bar in the ejecting direction.

9. A machine for drilling commutator brushes comprising a frame, a fixed rod supported horizontally by the frame and providing a disc having a horizontal cross-slot at right angles to the rod axis, a dial supported by the frame for rotation on an axis concentric with the rod axis and having an even number of radial slots in the plane of the cross-slot, means for indexing the dial to locate radial slots above the cross slot respectively at loading and drilling stations and to locate two radial slots in alignment with the cross-slot, an ejector bar for moving a brush in one of the dial slots aligned with the cross slot through the cross-slot and out through the other dial slot, a pressure-fluid servo for moving the bar in the ejecting direction and in the opposite direction to clear the dial, a drill head unit mounted on the frame and having a power operated drill and shaft and a mechanism operated by the shaft for advancing and retracting the drill with respect to a brush in the dial slot at the drilling station and means for causing rotation of the shaft of the unit for one revolution, a device supported by the frame for retarding ejecting movement of the bar during the entrance of the drill into the brush and retraction therefrom, a device controlling mechanism included in the drill head unit, means for connecting said mechanism with the device, means responsive to completion of bar ejecting movement for causing the servo to retract the bar, means responsive to completion of bar retraction for causing the dial indexing means to operate and means responsive to completion of indexing for causing operation of the drill head unit means which causes rotation of the drill head unit shaft and for causing operation of the servo to move the bar in the ejecting direction.

RICHARD M. GOODWIN.

REFERENCES CITED

The following references are of record in the file of this patent:

UNITED STATES PATENTS

| Number | Name | Date |
|---|---|---|
| 1,500,963 | Speegle | July 8, 1924 |
| 1,670,717 | Einstein | May 22, 1928 |
| 1,723,249 | Noble | Aug. 6, 1929 |
| 1,947,348 | Lovejoy | Feb. 13, 1934 |
| 1,964,435 | Holmes | June 26, 1934 |
| 1,975,007 | Kingsbury | Sept. 25, 1934 |
| 2,042,257 | Harrison et al. | May 26, 1936 |
| 2,097,783 | Cole | Nov. 2, 1937 |
| 2,264,105 | White | Nov. 25, 1941 |
| 2,302,878 | Muhl et al. | Nov. 24, 1942 |
| 2,395,518 | Svenson | Feb. 26, 1946 |